United States Patent
Norton et al.

(10) Patent No.: US 6,510,411 B1
(45) Date of Patent: Jan. 21, 2003

(54) TASK ORIENTED DIALOG MODEL AND MANAGER

(75) Inventors: Lewis M. Norton, Paoli, PA (US); Deborah A. Dahl, Plymouth Meeting, PA (US); Marcia C. Linebarger, Elkins Park, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/430,315

(22) Filed: Oct. 29, 1999

(51) Int. Cl.$^7$ .............................................. G10L 15/04
(52) U.S. Cl. ..................... 704/254; 704/256; 704/251; 704/260; 704/257; 704/275; 379/67; 379/76; 379/88.01; 379/88.03
(58) Field of Search ................................. 704/250, 254, 704/251, 256, 257, 275, 270, 260; 379/67, 76, 88.01, 88.03; 706/61

(56) References Cited

U.S. PATENT DOCUMENTS

| | | | | |
|---|---|---|---|---|
| 5,694,558 A | * | 12/1997 | Sparks et al. | 395/326 |
| 5,748,974 A | * | 5/1998 | Johnson | 395/759 |
| 5,794,193 A | * | 8/1998 | Gorin | 704/250 |
| 5,812,977 A | * | 9/1998 | Douglas | 704/275 |
| 5,860,063 A | * | 1/1999 | Gorin et al. | 704/257 |
| 6,173,261 B1 | * | 1/2001 | Arai et al. | 704/257 |
| 6,192,110 B1 | * | 2/2001 | Abella et al. | 379/88.01 |
| 6,246,981 B1 | * | 6/2001 | Papineni et al. | 704/235 |
| 6,246,986 B1 | * | 6/2001 | Ammicht et al. | 704/270 |
| 6,269,336 B1 | | 7/2001 | Ladd et al. | 704/270 |
| 6,321,198 B1 | * | 11/2001 | Hank et al. | 704/270 |

OTHER PUBLICATIONS

Riccardi et al., ("A spoken language system for automated call routing", IEEE International Conference on ICASSP'97—Acoustics, Speech, and Signal Processing, vol. 2, pp. 1143–1146, Apr. 1997).*

Kamm et al., ("Design and evaluation of spoken dialog systems", 1997 IEEE Workshop on Automatic Speech Recognition and Understanding, pp. 11–18, Dec., 1997).*

Alicia Abella and Allen L. Gorin; Construct Algebra: Analytical Dialog Management from the 37$^{th}$ Annual Meeting of the Association for Computational Linguistics; Jun. 20–26, 1999.

* cited by examiner

*Primary Examiner*—Vijay Chawan
(74) *Attorney, Agent, or Firm*—Woodcock Washburn; Lise A. Rode; Mark T. Starr

(57) ABSTRACT

A simplification of the process of developing call or dialog flows for use in an Interactive Voice Response system is provided. Three principal aspects of the invention include a task-oriented dialog model (or task model), development tool and a Dialog Manager. The task model is a framework for describing the application-specific information needed to perform the task. The development tool is an object that interprets a user specified task model and outputs information for a spoken dialog system to perform according to the specified task model. The Dialog Manager is a runtime system that uses output from the development tool in carrying out interactive dialogs to perform the task specified according to the task model. The Dialog Manager conducts the dialog using the task model and its built-in knowledge of dialog management. Thus, generic knowledge of how to conduct a dialog is separated from the specific information to be collected in a particular application. It is only necessary for the developer to provide the specific information about the structure of a task, leaving the specifics of dialog management to the Dialog Manager. Computer-readable media are included having stored thereon computer-executable instructions for performing these methods such as specification of the top level task and performance of a dialog sequence for completing the top level task.

17 Claims, 13 Drawing Sheets

Global Prompts for Diner

Welcome: Welcome

Greeting Prompts

Initial: If you would like instructions on the use of this system, say "help", otherwise say "continue".

Expert: "help" or continue".

Help: Besides answering the system's questions, you may perform one of the following actions at any

Confirmation Prompts

Initial: Is that correct? Please simple say 'yes', or make corrections one at a time.

Help: If your order is correct, say 'yes'; otherwise make corrections one at a time.

Repair Prompts

Initial: Please make corrections one item at a time.

Help: In this prototype, you make corrections by saying either Correction, <value> or Correction, no

Wrapup Prompts

Initial: Now you can give me another order, or you can stop. Which would you like to do?

Expert: Another order, or stop.

Confirm Stop Prompts

Initial: The system recognized a request to stop the session. If you do want to stop, please confirm by Expert: "stop" or "continue".

Thanks: Goodbye!

Prefixes

Status: You ordered

Must Have: Sorry, you have to have a

Can't Have: You can't have

Task Completion

Coming right up

[ OK ]  [ Cancel ]

*Figure 6D*

TASK ORIENTED DIALOG MODEL AND MANAGER

FIELD OF THE INVENTION

The present invention relates generally to systems in which a computer carries on a spoken language dialog with a user. More particularly, the present invention relates to a task oriented dialog model, a development tool for creating an output file based on the task oriented dialog model and a Dialog Manager for carrying out the dialog in accordance with the output file from the development tool.

BACKGROUND OF THE INVENTION

Systems in which a computer carries on a spoken language dialog with a user for gathering information from and conveying information to a user have been known. For example, interactive voice response (IVR) systems have been implemented in telephony systems for conveying and receiving information. However, current approaches to spoken language dialog design, such as the Unisys Dialog Design Assistant, VoxML, HTML, general programming language, and other IVR development tools, require that the developer manually construct a highly detailed sequence of dialog states that define the call flow (or dialog flow) of the application. The developer must specify both how to manage the dialog and the content of the dialog. In other words, for every possible dialog state, a developer must anticipate any possible dialog states to which a dialog may proceed and also specify the content for every dialog state. This is a time consuming and error-prone process especially for dialogs with more than a trivial level of complexity. Furthermore, it is very difficult to maintain consistency of "sound and feel" throughout the dialog when so much of the process is manual.

Also, the speech recognition industry is a relatively fast paced industry in which products can be outmoded by newer technologies. Individually coding particular grammar sets and implementing them in specific systems does not lend itself to flexible use of current evolving technologies. Thus, it would be advantageous to generalize the specification of the grammar and dialog description. It would be further advantageous to separate the specification of the grammar and the dialog from the speech components that ultimately make sounds and reduce sounds to words and language a computer can interpret.

Consequently, it would be advantageous to provide a way to simplify the process of developing call or dialog flows for use in a spoken dialog system. It would be further advantageous to develop a task oriented dialog model whereby a top-level task can be structured according to tasks and subtasks, each having properties relating to the structure.

However, without a tool to ease the specification of the task model, it would be difficult to make use of such a task-oriented dialog model and manager. It is simply very hard to hand-code a task model in Java (or any other programming language), except for the most trivial applications.

Previously, dialog specification tools have been provided to facilitate thin of natural language dialogues. For example, U.S. Pat. No. 6,321,198, entitled "Apparatus for Design and Simulation of Dialogue", relates to a tool for use by designers of natural language dialogues. In one aspect, the tool to which that application relates provides a system which permits construction of a call flow application and enables a designer to verify the call flow cycle by simulation of the application before finalizing the application and writing code. This tool permits more flexible callflow specification, but does not permit specification in accordance with a task oriented dialog model.

It would thus be advantageous to provide a dialog development tool that would facilitate the structural specification of a task in accordance with a task oriented dialog model. It would be further advantageous to create a development tool which would allow a developer to define a task to be performed and the substructure of the task according to a task model, such that a spoken dialog system can be implemented with output from the development tool via a Dialog Manager, without specifying a specific call flow.

It would be still further advantageous to provide a method for managing a dialog automatically in accordance with output from the development tool such that the developer need only specify the structure of a task to be performed in accordance with the task oriented dialog model.

SUMMARY OF THE INVENTION

The present invention provides a way to simplify the process of developing call or dialog flows for use in a spoken dialog system. The three principal aspects of a presently preferred implementation of the invention include a task-oriented dialog model (or task model), development tool and a Dialog Manager. The task model is a framework for describing the application-specific information needed to perform the task. The development tool is an object that interprets a user specified task model and outputs information for a spoken dialog system to perform a top level task according to the specified task model. The Dialog Manager is a runtime system that uses output from the development tool in carrying out interactive dialogs to perform the task specified according to the task model. The Dialog Manager conducts the dialog using the task model and its built-in knowledge of dialog management. Thus, generic knowledge of how to conduct a dialog is separated from the specific information to be collected in a particular application. It is only necessary for the developer to provide the specific information about the structure of a task, leaving the specifics of dialog management to the Dialog Manager.

Other aspects of the present invention are described below.

BRIEF DESCRIPTION OF THE DRAWINGS

The task model, development tool and Dialog Manager in accordance with the present invention are further described with reference to the accompanying drawings in which:

FIGS. 6A through 6E depict exemplary screenshots for a second embodiment of a user interface for the development tool in accordance with the present invention.

DETAILED DESCRIPTION OF PREFERRED EMBODIMENTS

Overview

Figure 1:
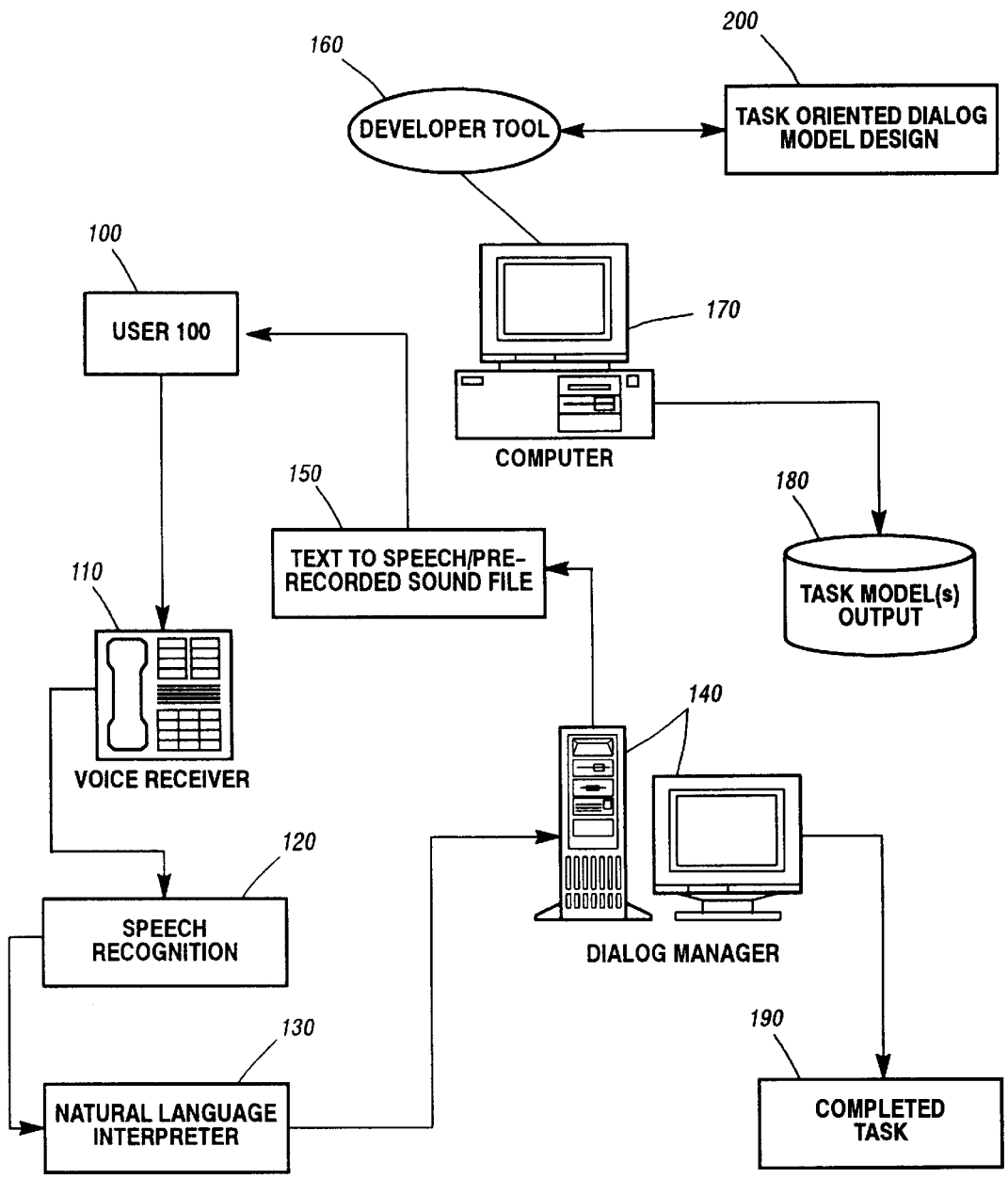
FIG. 1 is a block diagram of the dialog managing system in accordance with the task oriented dialog model of the present invention.

The present invention provides a task model, a development tool for specifying a task according to the task model and a Dialog Manager for managing a dialog in cooperation with output from the development tool. The present invention relates generally to systems in which a computer carries on a spoken language dialog with a user. For example, the invention may be employed to implement a PC-based or telephony-based interactive voice response (IVR) system (e.g., a system for ordering food from a diner, making airline reservations, or buying or selling stocks). Other known approaches to spoken language dialog design require that the developer manually construct a highly detailed sequence of dialog states that define the call flow (or dialog flow) of the application. This is a time consuming, error-prone and it is difficult to maintain consistency of "sound and feel" when the dialog is designed in this fashion.

The present invention simplifies the process of developing call or dialog flows for use in a spoken dialog system, such as an IVR system. The task model provides a framework for describing the task-specific information needed to perform a top-level task. This may be in the form of an XML specification or other flat file format, or information stored in a database (such as the Unisys SAPR). The task model includes the application-dependent information needed for the runtime system to conduct the dialog. Conceptually, the task model can be viewed as a tree, where the nodes of the tree represent task/subtask relationships, and for which variables are assigned values in the course of the dialog. Each variable has a domain of appropriate values.

The development tool is a tool for creating such a task model. A development tool in accordance with the present invention can be software with a user interface for specifying inputs according to the task model. Such a software tool simplifies the design of dialogs and permits confirmation that a design will work through simulation before being implemented in a run-time system. Modification of a design is also accomplished efficiently and easily through use of the tool to change task specifications and relationships of subtasks to other subtasks and to the overall task.

The Dialog Manager in accordance with the present invention is a runtime system that uses predefined task models in carrying out interactive dialogs with users. The Dialog Manager conducts the dialog using the task model and its built-in knowledge of dialog management. The default execution for the Dialog Manager could be to step through the tasks in the task model in a-default order, requesting values for the required variables at each point. Deviations from the default occur when either: (a) the user initiates a digression by volunteering information or asking for help, clarification, etc. or (b) the system initiates a digression motivated by an apparent error condition, such as multiple speech recognition failures, or ambiguous,input.

According to the invention, generic knowledge of how to conduct a dialog is separated from the specific information to be collected in a particular application. It is only necessary for the developer to provide the application or task specific information into the development tool, leaving the specifics of dialog management to the Dialog Manager. Thus, the invention permits the developer to describe only the task to be performed, i.e., to specify the task model, leaving management of the callflow and other generic tasks to the Dialog Manager.

The present invention addresses the shortcomings of prior dialog systems in several ways. Some research systems use a frame-based approach, which also allows the developer to specify the dialog at a higher level. These frame-based approaches, however, still require that the dialog be specified in more detail than does the task-oriented approach of the present invention since a frame-based approach requires error anticipation, callflow specification and manually entered dialog management. Thus, for example, a simple change in design or task description in a frame-based approach can have sweeping consequences. Callflow from state to state, content, and error handling, among other things, must be changed according to the new task description. By viewing the task to be performed in terms of its substructure according to a task model, and by leaving dialog management to an automated run-time, system using output formatted according to the task model, these shortcomings are overcome.

Furthermore, if an individual task is programmed individually to work with an IVR system, not only is the project much more complex, but the time required to complete such an undertaking is great. The present invention addresses this problem by minimizing the amount of task description required. The dialog designer need only specify a task model with the development tool of the present invention, and the Dialog Manager handles the dialog in accordance with output from the development tool. Thus, the time to market for an IVR system is greatly decreased by the present invention. Additionally, changes to a task model description can be made quickly, and thus the ultimate dialog maintained with an end user can be kept current along with changes in technologies, goods and services. Thus, overhead and maintenance costs of an IVR system are reduced and time to market is improved.

An assumption in line with the present inventive approach is that accomplishing most tasks of interest requires filling out a record (the task model) containing values of variables that need to be determined in order to complete the task. Even in a frame-based approach, if information is to be received by the IVR system, there are slots for information that need to be filled during the process. These slots are specified during the task description. Problems, however, are encountered in a frame-based approach when the task becomes complex because if the dialog is defined in terms of a state callflow, a change in the task description can be difficult to implement.

The present invention addresses these shortcomings of the prior art by providing a generalization of dialog specification, allowing for hierarchically organized tasks each of which can have further properties and structure. Assuming that the goal of the user is to complete the highest level task, this requires completion of the subtasks into which the highest level task breaks down. Completing a subtask means defining the values of the variables that are required by each subtask. Most of the values of the variables typically come from the user, but they can in general come from other sources such as a database or the computer system (for instance, the current date). Thus, not only is the task description greatly simplified but in addition a change in the task description can be easily implemented, since a change is directed to an identifiable portion of the tree structure representing the task model. Because the Dialog Manager can perform a dialog sequence once the task model has been specified, only the task model need be altered to perform a new task.

FIG. 1 is a block diagram of a preferred embodiment of the dialog managing system in accordance with the present invention. A developer specifies a task to be performed by entering data into a computer 170 having a developer tool 160 loaded therein. The data entered defines a task; in accordance with the task model design 200 of the present invention. Once specified, the tool 160 formats an output 180 associated with the task that was input by the developer in accordance with the task model design 200. This task model output 180 can be stored or directly sent to the Dialog Manager 140. The Dialog Manager 140 carries out a dialog in accordance with the output 180.

As shown, a user 100 speaks into a telephone having a voice receiver 110, or other input device. Speech recognition software 120 reduces the sounds to words. Natural language interpretation (NLI) software 130 reduces words into arguments and parameters understood by the Dialog Manager 140. The Dialog Manager 140 then processes the output of the NLI software 130 to determine if additional values associated with the task model output 180 still need to be gathered. In other words, the Dialog Manager 140 determines if the top level task of the specified task has been completed. If so, completed task information 190 associated with the completed task is output from the Dialog Manager. If not, the Dialog Manager 140 further conducts a dialog necessary to complete the top level task. Thus, the Dialog Manager 140, using text to speech software or pre-recorded sound files 150, further prompts the user 100 for information and the dialog continues as described above until the top level task is complete.

Task Oriented Dialog Model

A task-oriented dialog model describes the application-specific information needed to perform the task. The task model can be viewed as a data structure that specifies a top-level task and associated subtasks for performance by the Dialog Manager. Generally, there is a top level task which is the overall task to be performed by the Dialog Manager. Rolesets define subtasks of the top level task, each having a set of concepts. When a concept or value is chosen for the roleset, it becomes the filler of the roleset. A chosen concept may have additional structure associated with it. Each concept, however, does not need to have the same structure. In addition to the structure of the task model, a developer can input other properties such as which portions of the data structure require confirmation. For example, it may be desirable to confirm an entire roleset or confirm an individual concept.

Tasks are thus represented using the concept and roleset classes. A concept with further structure has a list of rolesets. A roleset has a range and a set of concepts that are its possible fillers. In such a branched data structure, subtasks help specify higher level tasks, and higher level tasks help specify the top level task. Further, there is no limit to the number of sub-levels for subtasks, either vertically or horizontally.

Figure 2A:
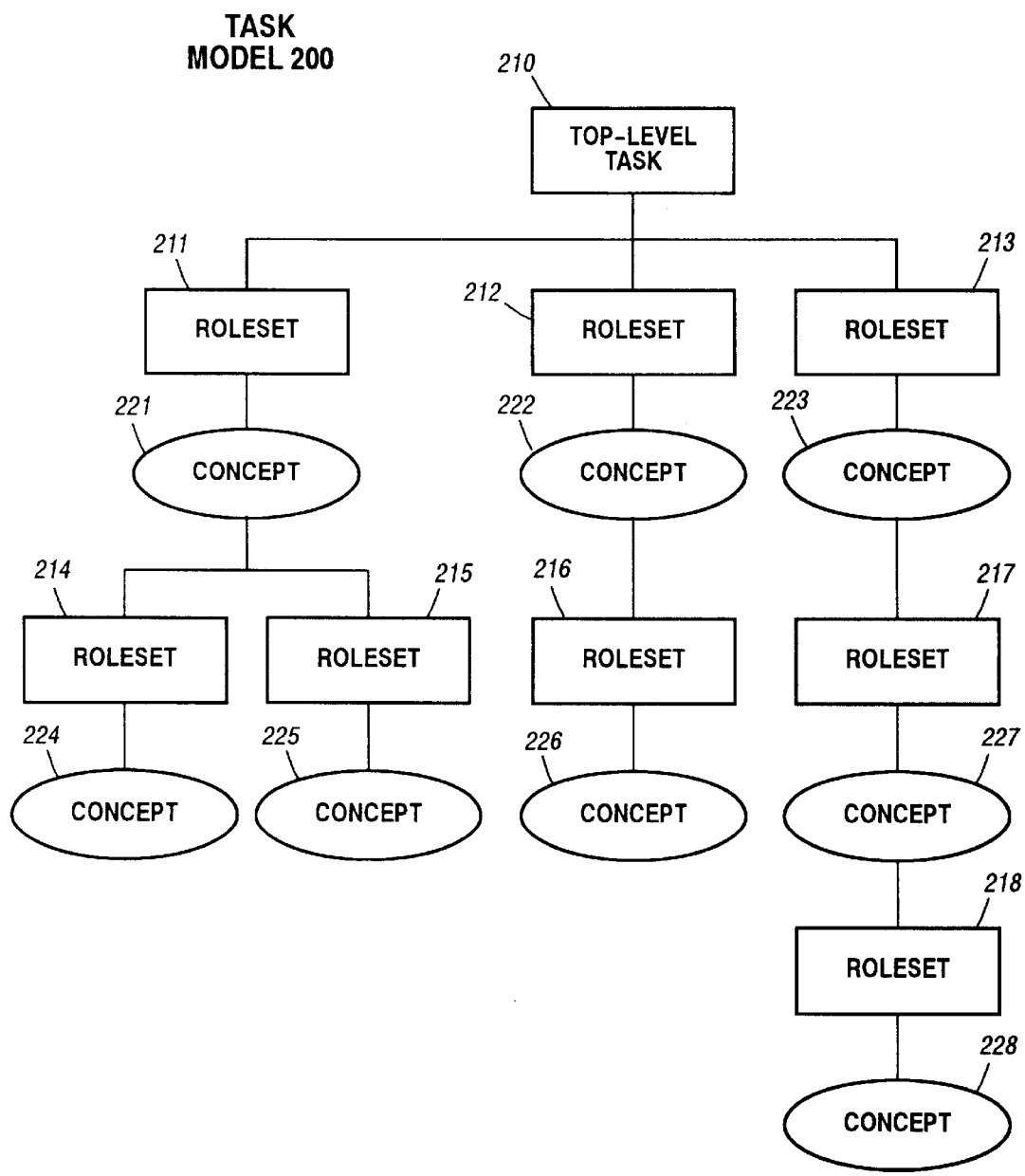
FIGS. 2A–2C are block diagrams of different instantiations of a task model design in accordance with the present invention.

FIG. 2A is a block diagram of an instantiation of a task-oriented dialog model 200. A tree structure is shown having a top-level task 210 (a first object) to be performed. The top level task 210 has substructure defined by rolesets 211, 212 and 213 (second objects representing an element of the first object). Each of rolesets 211, 212 and 213 has a set of concepts that define a domain of values for rolesets 211, 212 and 213. For example, associated with roleset 211 is a set of concepts that define a domain of values. When concept 221 is selected e.g., by a consumer in a dialog, additional structure can result, since concept 221 can also have a list of rolesets. Additional structure does result in the example shown, namely rolesets 214 and 215.

In the example, rolesets 211, 212 and 213 have concepts 221, 222 and 223, respectively. Concepts 221, 222 and 223 are thus the fillers of rolesets 211, 212 and 213, respectively, and can result in additional structure, depending upon the particular concept. The rolesets and associated concepts, or set of concepts, may be generally viewed as objects or elements of a data structure stored on or in a computer readable medium. It is to be understood that the term "object" refers generally to a structure that includes data and/or methods. Even a structure that contains only other objects can be considered an object itself.

As mentioned, a chosen concept can have additional structure associated therewith. In the example, concept 221 has additional rolesets 214 and 215 for defining further substructure or subtasks to be performed before completing the top level task. These rolesets 214 and 215 also have corresponding sets of concepts. Concepts, obtained in a dialog, from these sets of concepts become fillers of the respective rolesets. In the example, concepts 224 and 225 are the fillers of rolesets 214 and 215, respectively. Additionally, concepts 222 and 223 have additional substructure defined by rolesets 216 and 217 filled by concepts 226 and 227, respectively. Furthermore, concept 227 has additional substructure defined by roleset 218 filled by concept 228.:

Thus, a top level task 210 can have a vertical subtask structure in which any one subtask requires additional information about a characteristic of a filler of the roleset for completion of the subtask. In the example, concept 223 is a filler of roleset 213. Structural definition is not complete with this information since concept 223 has further substructure defined by roleset 217 i.e., roleset 217 still has a set of concepts or domain of values which are not yet specified. To illustrate further, once concept 227 is specified as the filler of roleset 217, further information about concept 227 is still needed for completion of the subtask defined by roleset 213. In the example, a subtask defined by roleset 218 must be completed before concept 227 is fully specified. Thus, the subtask defined by roleset 213 is not complete until concept 228, having no further substructure, is specified from the set of concepts for roleset 218. This is an example of vertical substructure.

A top level task 210 can also have a horizontal subtask structure in which any one subtask requires additional information about multiple characteristics of a filler of the roleset for completion of the subtask, with information about each characteristic being necessary to completely define the subtask. In the example, concept 221 has additional substructure defined by rolesets 214 and 215. Both rolesets 214 and 215 have a set of concepts or a domain of values associated therewith. Concept 221 is thus not fully specified until both roleset 214 and roleset 215 have fillers of concept 224 and concept 225 (or any concept from the set of concepts or in the domain of values for the roleset), respectively. Both rolesets 214 and 215 define additional structure for concept 221, and both need to be satisfied (provided with a filler) independently before concept 221 is specified. Rolesets 214 and 215 exemplify horizontal substructure, as do rolesets 211, 212 and 213.

An analogy that can be used to conceptualize rolesets and concepts is the following: a roleset is analogous to a question and a set of concepts is analogous to the possible answers to the question, and a filler is analogous to the answer given to the question. For dialog purposes, i.e., for conducting a dialog to complete a task, questions need answers. Consequently each roleset has an associated set of concepts.

Thus, the task oriented dialog model in accordance with the present invention is a multi-dimensional framework for a dialog, which can have both horizontal and vertical structure. Using this task model, a top level task can be broken into constituent subtasks defined by a list of rolesets each having a set of concepts, or domain of values, any one of which having possible further properties and substructure.

Figure 2B:
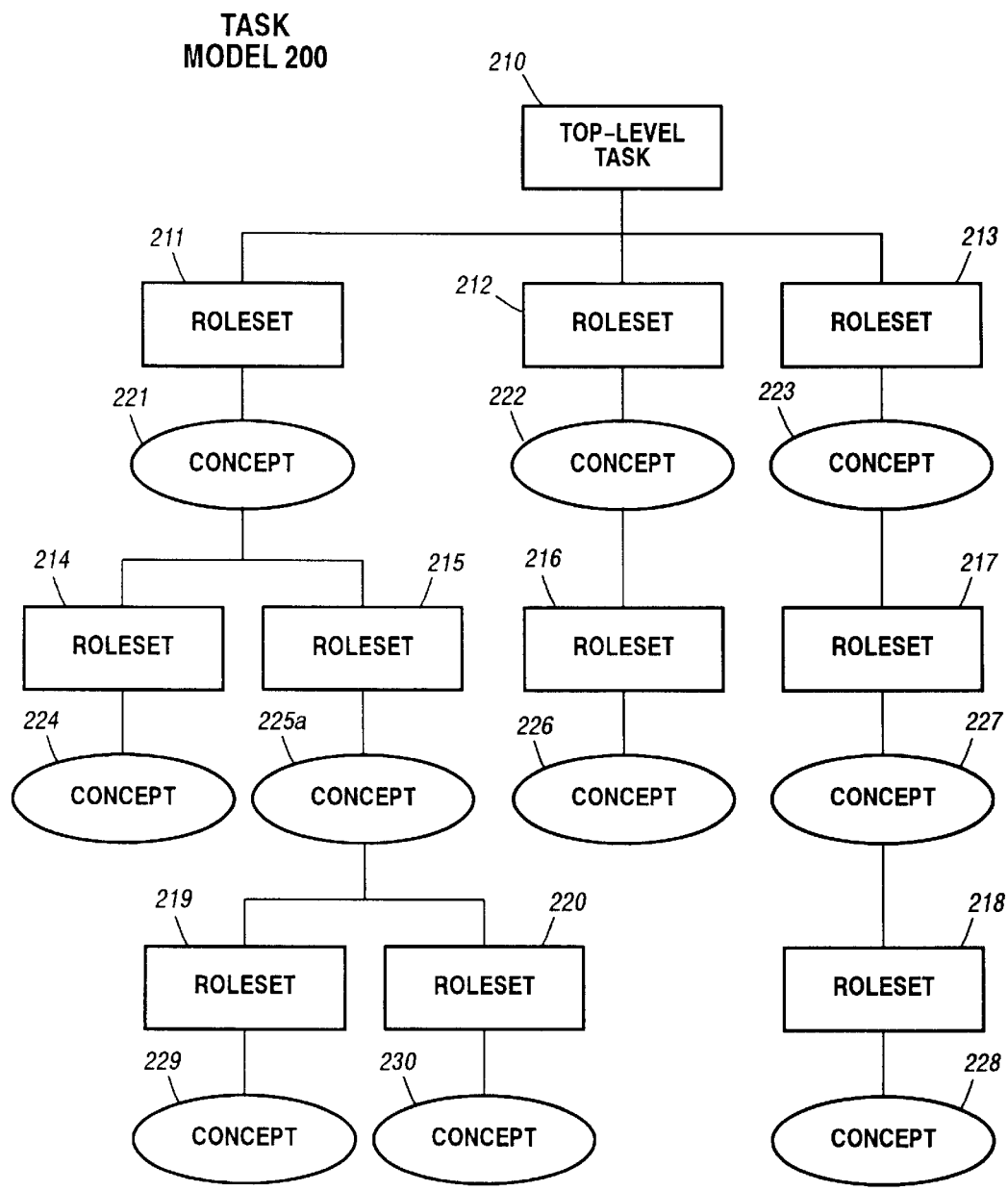

To demonstrate further, FIG. 2B is a block diagram of another instantiation of the task model 200 for performing top-level task 210. What is different, however, is that roleset 215 has been filled by a different concept 225*a*. As explained, roleset 215 has a set of concepts or domain of values. When a different concept is chosen to fill the roleset 215, a different substructure can result. As shown, concept 225*a* has additional substructure as defined by rolesets 219 and 220. In the example, concepts 229 are 230 are fillers for rolesets 219 and 220, respectively. FIGS. 2A and 2B thus show different instantiations of task model 200.

Figure 2C:
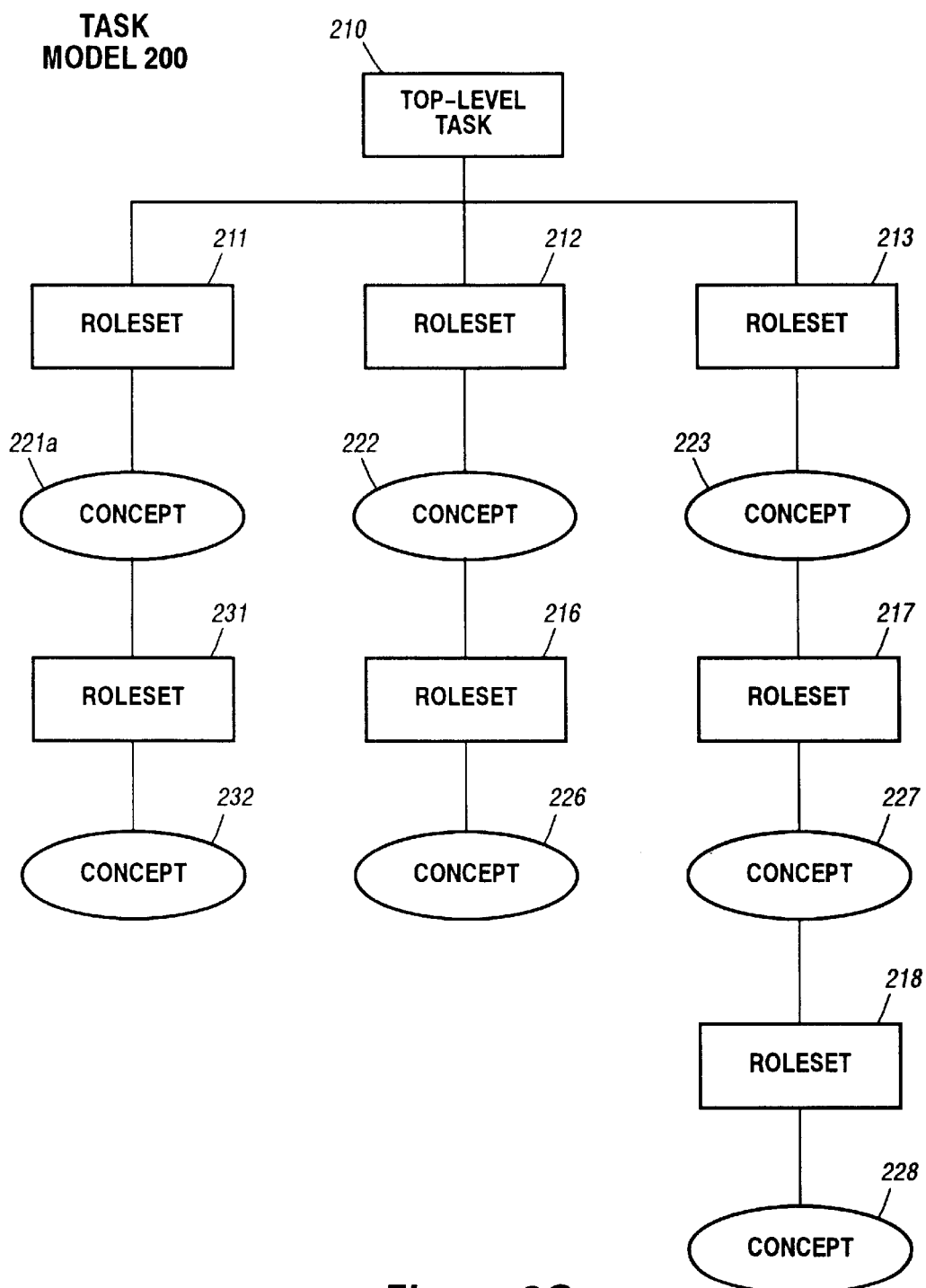

To illustrate still further, FIG. 2C is a block diagram of yet another instantiation of the same top level task 210 to be specified according to task model 200 as in FIGS. 2A and 2B. What is different is that concept 221 a has filled roleset 211 instead of concept 221. A different substructure can thus result. As shown, instead of rolesets 214 and 215, roleset 231 defines additional substructure for concept 221a and concept 232 is shown to be the filler of roleset 231.

Thus, an application may demand that different concepts, as fillers of a roleset, have different resulting structure. Thus, the multi-dimensional tree structure of the task model will not take on a specific branched structure, capable of being reduced to the diagrammatic form of FIGS. 2A to 2C, until fillers are specified. However, for many applications, concepts can all have equal structure. For example, specifying bread for a sandwich can have equal structure for concepts turkey, ham and cheese and roast beef i.e., there is no reason why bread can't have the same structure for all of these sandwich types. Thus, in a presently preferred embodiment of the present invention, for ease of use and implementation, the developer can specify that concepts, from a set of concepts associated with a roleset, have equal structure.

It should be noted, however, that although an instantiation of a task model is not set forth until concepts become fillers for each roleset, there is still some structure to the overall task model. Particular instantiations resulting from a dialog are not limitless, since the developer defines which concepts have further substructure. Thus, even with unspecified concepts i.e., even before a dialog has been carried out in accordance with the task model, the task model defines metes and bounds for instantiations that can result from a dialog using the task model.

Figure 3A:
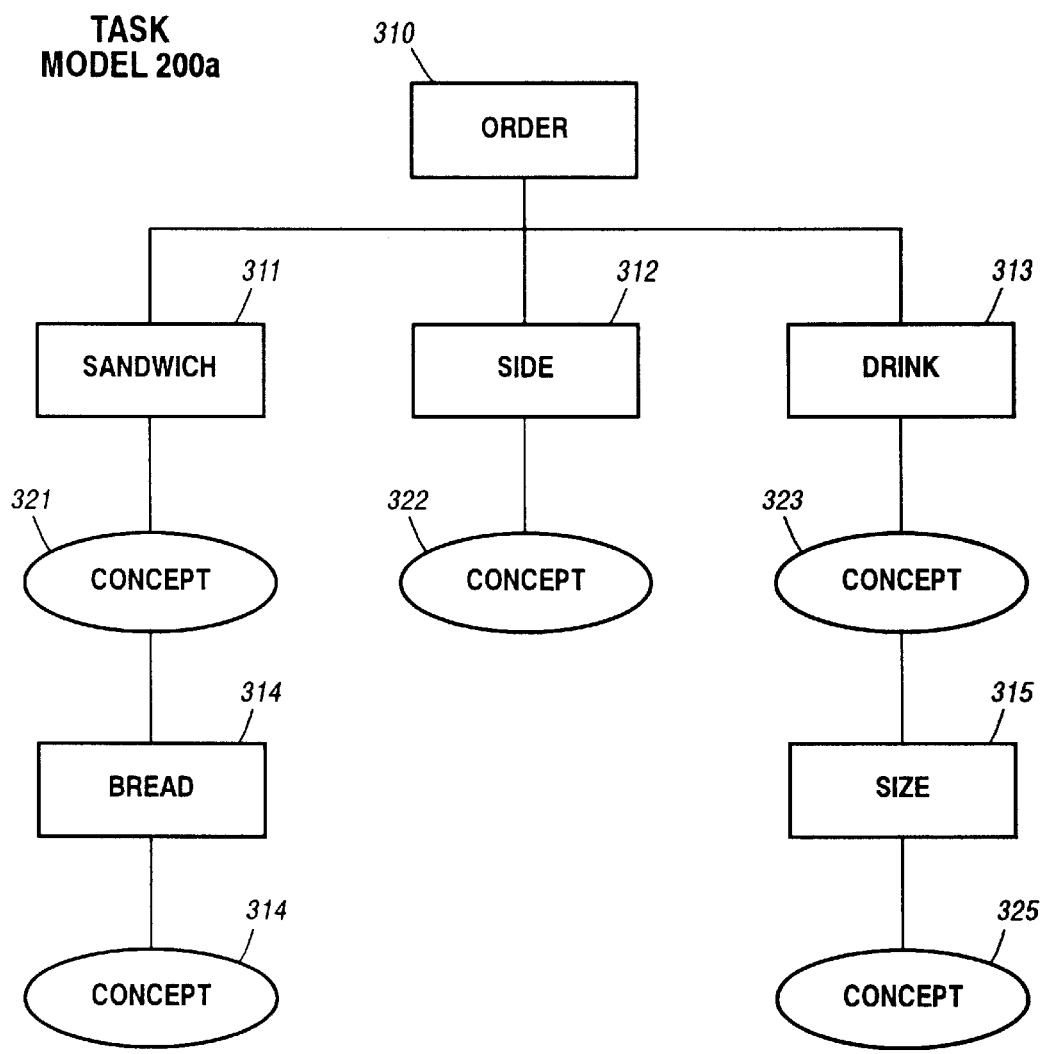
FIG. 3A is a block diagram of an instantiation of a meal order task model in accordance with the present invention.

FIG. 3A is; a block diagram of an instantiation of a more specific top level task specified in accordance with the task oriented dialog model of the present invention. In this case, a diner meal order is the top level task to be performed. According to the specified task model 200*a*, the complete order 310 is the top level task. An order consists of rolesets such as sandwich 311, side 312 and drink 313. A domain of values can fill each of these rolesets. For example, in the case of sandwich roleset 311, possible fillers may be grilled cheese, tuna salad, or turkey pastrami. In the case of side 312, possible fillers include french fries, cole slaw and potato salad. In the case of drink 313, possible fillers include cola, diet cola, root beer and lemon-lime.

Once a filler is specified for a roleset, a filler may have additional structure. Thus, if tuna salad concept 321 is specified as a filler for sandwich 311, the type of bread 314 remains to be specified. In other words, tuna salad also becomes a subtask to be performed. The roleset of tuna salad/bread may consist-of white, rye, whole wheat and kaiser roll. Once concept 314 is specified as a kaiser roll, for example, since there is no additional substructure, the subtask sandwich 311 is complete. In a similar manner a drink size for a chosen drink is determined. One notes that different bread choices may result for different sandwiches and that different sizes can be offered for different drinks. Or size may not even be a consideration if only one size is available.

Thus far, the task model has been described in a broad sense, but additional features can be specified in accordance with the present invention. For example, properties can be assigned to both tasks and rolesets in a tabular or other format to account for additional structural properties of the task model. These additional features and properties can be considered part of the task model itself, or treated as properties entered into the development tool in addition to the task model description that further aid the Dialog Manager in conducting a dialog.

Additional task properties beyond the name of a task and further rolesets for the task include whether confirmation is to be requested and definitions for items within the scope of the task. Additional roleset properties beyond the name, domain of values and possible fillers include prompts for fillers, prompts for quantities, help information, status prefixes, replies for fillers, whether confirmation is to be requested and override messages. On top of task and roleset properties, messages can be provided that are generalized for certain situations that are likely to be encountered or repeated, such as a greeting welcome.

A sample specification in accordance with the diner meal order task model 200*a* might include the following, which can be specified with the development tool of the present invention:

Properties of task order:
    roles: sandwich side drink
    confirmation requested
    definition('side order'): 'Something else to eat with your sandwich.'
    definition('cole slaw'): 'Cole slaw is just chopped cabbage with some salad dressing.'
    Properties of role-set order:sandwich:
range: [1,1]
    possible fillers: 'grilled cheese' 'tuna salad' turkey pastrami
    prompt for filler: 'What type of sandwich do you want?'
Properties of role-set order:side:
    range: [0,1]
    possible fillers: 'french fries' 'cole slaw' 'potato salad'
    prompt for number: 'Would you like a side order with your' filler(order:sandwich)'?'
    prompt for filler: 'Today we have french fries, cole slaw, or potato salad.'
    help for number: 'We have french fries, cole slaw, or potato salad.'
    help for filler: 'The only side orders we have today are french fries, cole slaw, and potato salad.'

```
status prefix: with
name: 'side order'
reply for filler: 'Good choice!'
choices message override: 'We have french fries, cole
    slaw, or potato salad.'
Properties of role-set order:drink:
    range: [0,1]
    possible fillers: cola 'diet cola' 'root beer' lemon-lime
    prompt for number: 'Something to drink with that?'
    prompt for filler: 'We have Cola, Diet Cola, root beer, and
        Lemon-lime.'
    status prefix: 'with a'
    subtask confirmation requested
Properties of task 'grilled cheese':
    name: 'grilled cheese sandwich'
    roles: bread
Properties of role-set 'grilled cheese':bread:
    range:[1,1]
    possible fillers: white rye 'whole wheat'
    prompt for filler: 'What kind of bread would you like your
        grilled cheese sandwich on?'
    status prefix: on
    filler confirmation requested
Properties of task 'tuna salad':
    name: 'tuna salad sandwich'
    roles: bread
Properties of role-set 'tuna salad':bread:
    range: [1,1]
    possible fillers: white rye 'whole wheat' 'kaiser roll'
    prompt for filler: 'What kind of bread would you like your
        tuna salad sandwich on?'
    status prefix: on
    filler confirmation requested
Properties of task turkey:
    name: 'turkey sandwich'
    roles: bread
Properties of role-set turkey:bread:
    range: [1,1]
    possible fillers: white rye 'whole wheat' 'kaiser roll'
    prompt for filler: 'What kind of bread would you like your
        turkey sandwich on?'
    status prefix: on
    filler confirmation requested
Properties of task pastrami:
    name: 'pastrami sandwich'
    roles: bread
Properties of role-set pastrami:bread:
    range: [1,1]
    possible fillers: white rye 'whole wheat' 'kaiser roll'
    prompt for filler: 'What kind of bread would you like your
        pastrami sandwich on?'
    status prefix: on
    filler confirmation requested
Properties of task 'kaiser roll':
    name: 'a kaiser roll'
Properties of task cola:
    name: 'Cola'
    roles: size
Properties of role-set cola:size:
    range: [1,1]
    possible fillers: small medium large
    prompt for filler: 'Small, medium, or large Cola?'
    status prefix: '—'
    left modifies owner
Properties of task 'diet cola':
    name: 'Diet Cola'
    roles: size
Properties of role-set 'diet cola':size:
    range: [1,1]
    possible fillers: small medium large
    prompt for filler: 'Small, medium, or large Diet Cola?'
    status prefix: left
    modifies owner
Properties of task 'root beer':
    roles: size
Properties of role-set 'root beer':size:
    range: [1,1]
    possible fillers: small medium large
    prompt for filler: 'Small, medium, or large root beer?'
    status prefix:
    left modifies owner
Properties of task lemon-lime:
    name: 'Lemon-lime'
    roles: size
Properties of role-set lemon-lime:size:
    range: [1,1]
    possible fillers: small medium large
    prompt for filler: 'Small, medium, or large Lemon-lime?'
    status prefix: '—'
    left modifies owner
Messages:
greeting_welcome:
    Welcome to Debbie's diner!
status_prefix:
    You ordered
must_have refix:
    You must have
unavailable_prefix:
    You can't have
task_completion:
    Coming right up!
confstop thank_you:
    Goodbye!
greeting_initial:
    If you would like instructions on the use of this system,
        say "help", otherwise say "continue".
greeting_expert:
    "Help" or "Continue".
greeting_help:
    Besides answering the system's questions,
    you may perform one of the following actions at any time.
    You may ask for the CHOICES for answering a question.
    You may ask for the STATUS of the order so far.
    You may ask the system to make a CORRECTION.
    You may ask the system for HELP.
    You may ask the system to REPEAT what it just said.
    You may ask the system to START OVER.
    And you may ask to STOP the session.
``` confirm_task_initial:
  Is that correct? Please simply say "yes", or make corrections one at a time.
confirm_task help:
  If your order is correct, say "yes"; otherwise make corrections one at a time.
repair_task_initial:
  Please make corrections one at a time.
repair_task_help:
  In this system, you make corrections by saying either
  Correction, <value>. E.g., Correction, rye. or
  Correction, no <value>. E.g., Correction, no drink.
confstop_initial:
  The system recognized a request to stop the session.
  If you do want to stop, please confirm by saying "stop".
  If you want to continue, say "continue".
confstop_expert:
  "Stop" or "continue".
wrapup_initial:
  Now you can give me another order, or you can stop.
  Which would you like to do?
wrapup_expert:
  Another order, or stop.

Figure 3B:
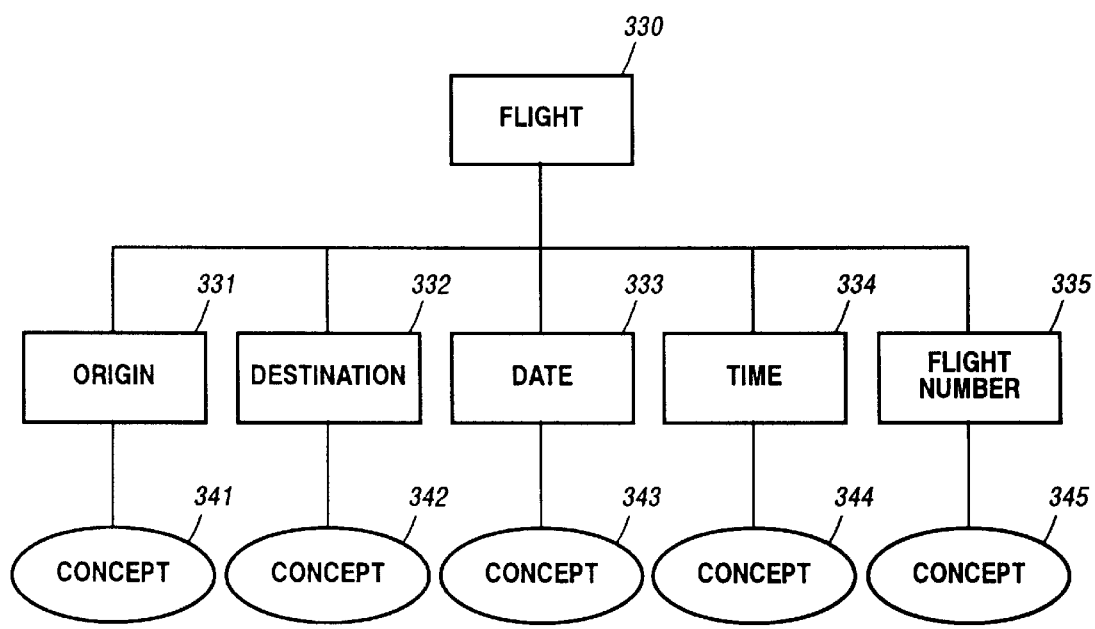
FIG. 3B is a block diagram of an instantiation of an airline ticket reservation task model in accordance with the present invention.

FIG. 3B is, another block diagram of a more specific task specified in accordance with the task oriented dialog model of the present invention. In this case, an airline ticket specification is the top level task to be performed. According to the specified task model 200b, the complete ticket specification 330 is the top level task. A specification consists of rolesets such as origin 331, destination 332, date 333, time 334 and number of travelers 335. A domain of values,can fill each of these rolesets. For example, in the case of origin 331, possible fillers may be Boston, Denver, Houston and Philadelphia. In the case of destination 332, possible fillers, may include Boston, Denver, Houston and Philadelphia. In the case of date 333, possible fillers can include any date that can possibly be offered by an airline, from the current date to a date in the future. This date can be represented in memory as a date argument, to be interpreted according to a predetermined algorithm. In the case of time 334, possible values may be any hour of the day, represented by a time argument. In the case of number of travelers 335, possible fillers may include 1, 2, 3 and 4.

Once a filler is specified for a roleset, a filler may have additional structure. However, in the example of FIG. 3B, no additional rolesets are specified for concepts. Once a filler is specified, the roleset is filled and the subtask is specified.

As with FIG. 3A, additional features can be specified according to the task model. For example, properties can be assigned to both tasks and rolesets to further set forth structural properties of the task to be completed. As previously mentioned, additional task properties beyond the name of a task and further rolesets for the task include whether confirmation is to be requested and definitions for items within the scope of the task. Additional roleset properties beyond the name, domain of values and possible fillers include prompts for fillers, prompts for quantities, help information, status prefixes, replies for fillers, whether confirmation is to be requested and override messages. On top of task and roleset properties, messages can be provided that are generalized for certain situations that are likely to be encountered or repeated, such as a task completion message.

A sample specification in accordance with the airline ticket reservation task model 200b might include the following, specified with the development tool of the present invention:

Properties of task flight:
  roles: origin destination date time number
  confirmation requested
Properties of role-set flight:origin:
  range: [1,1]
  possible fillers: boston denver houston philly
  prompt for filler: 'State the city you will be traveling from.'
  status prefix: from
  filler confirmation requested
Properties of role-set flight:destination:
  range: [1,1]
  possible fillers: boston denver houston philly
  prompt for filler: 'State the city you will be traveling to.'
  status prefix: to
Properties of role-set flight:date:
  range: [1,1]
  possible fillers: date(_)
  prompt for filler: 'On what date would you like to fly from' filler(flight:origin) 'to' filler(flight:destination) '?'
  status prefix: on
  choices message override: 'Any date from tomorrow to Dec. 31, 2099.'
Properties of role-set flight:time:
  range: [1,1]
  possible fillers: time(_)
  prompt for filler: 'And what time do you want to leave' filler(flight:origin) 'on' filler(flight:date) '?'
  status prefix: at
  reply for filler: filler(flight,time) 'it is.'
Properties of role-set flight:number:
  range: [1,1]
  possible fillers: 1 2 3 4
  prompt for filler: 'Please say the total number of people traveling, up to four.'
  status prefix: for
Properties of task boston:
  name: 'Boston'
Properties of task denver:
  name: 'Denver'
Properties of task hoiuston:
  name: 'Houston'
Properties of task philly:
  name: 'Philadelphia'
Messages:
  greeting_welcome:
  Thank you for calling. This is the Sample Airways voice information and services system.
status_prefix:
  A flight
must have_prefix:
  You must have
unavailable_prefix:
  There is no flight
task_completion:
  You will receive a confirmation in the mail.
confstop_thank_you:
  Goodbye!

greeting_initial:
   If you would like instructions on the use of this system, say "help",:otherwise say "continue".
greeting_expert:
   "Help" or "Continue".
greeting_help:
   Besides answering the system's questions,
   You may perform one of the following actions at any time.
   You may ask for the CHOICES for answering a question.
   You may ask for the STATUS of the order so far.
   You may ask the system to make a CORRECTION.
   You may ask the system for HELP.
   You may ask the system to REPEAT what itjust said.
   You may ask the system to START OVER.
   And you may ask to STOP the session.
confirm_task_initial:
   Is that correct? Please simply say "yes", or make corrections one at a time.
confirm task_help:
   If your flight is correct, say "yes"; otherwise make corrections one at a time.
repair_task_initial:
   Please make corrections one at a time.
repair_task_help:
   In this system, you make corrections by saying either
   Correction, <value>. E.g., Correction, Boston. or
   Correction, no <value>. E.g., Correction, no Denver.
confstop_initial:
   The system recognized a request to stop the session.
   If you do want to stop, please confirm by saying "stop".
   If you want to continue, say "continue".
confstop_expert:
   "Stop" or "continue".
wrapup_initial:
   At this point I can help you with another trip, or you can stop.
   Which would you like to do?
wrapup_expert:
   Another trip, or stop.

Of further advantage is that the task oriented dialog model in accordance with the present invention allows some subtasks to be optional. For example, default values can be assigned to subtasks if they are not performed, or some subtasks can be left out altogether. In the diner meal order described with reference to FIG. 3A, e.g., since not everyone may order a drink, if no reference is made to a drink by the user, the drink roleset need not be filled i.e., the subtask need not be carried out and is thus optional. Also, the task model in accordance with the present invention allows some tasks including the overall task to have multiple instances. For example, with reference to the diner meal order example, a consumer might order meals for the entire family or several sandwiches, but only one drink, etc.

Confirmation can also be specified for certain information in accordance with the task model. For example, a task designer could specify that certain information that has a high priority in terms of correctness be confirmed before accepting the information as a filler. Although a particular drink size may not be of a level of importance requiring confirmation, a Dialog Manager that takes orders for buying or selling stock may indeed want to confirm many different tasks and subtasks before proceeding with a purchase or sale. Thus, with the present invention, the task designer has the freedom to specify which tasks and subtasks are to be confirmed.

Help messages can also be embedded into the structure of the task model. The Dialog Manager can ultimately use these help messages to aid a user's request for help. Help messages can be in a variety of forms. A general help message that can make use of the structure of the task itself makes available to the user a list of possible choices concerning the possible directions for completion of the dialog and the task.

Thus, in the: task oriented dialog model of the present invention, tasks are represented using the concept and roleset classes, having properties associated therewith. A concept with structure has a list of rolesets. A roleset has a domain and a set of concepts that are its possible fillers. Messages can also be specified for situations that may be encountered frequently in a dialog, such as a greeting or a help message. In such a branched data structure, subtasks help specify higher level tasks, and higher level tasks help specify the top-level task and there is no limit to the number of sub-levels for subtasks, either vertically or horizontally.

Task Model Development Tool

To ease specification of the structure of a task in accordance with the task oriented dialog model, the present invention further comprises a tool for use by designers of dialog systems. Generally, using a mouse, keyboard or other input device, a designer can specify a top level task by entering the structure for the task in accordance with the task model. Input concerning additional structural properties can also be entered, e.g., input indicating which portions of a task model require confirmation. The output of the development tool is then formatted for use with the runtime system having a Dialog Manager in accordance with the present invention. The output can be stored in a computer readable medium before use with a runtime dialog managing system.

I. Input for Development Tool

For the development tool of the present invention, information entered by a designer in order to define a task according to the task-oriented dialog model can be characterized in two ways.

The first type of information is "model-level" information, i.e., each model has a greeting, an initial task, etc. By definition, there is only one instance of each item of model-level information, so there is a screen, screens, window or windows to collect this information from the task designer.

The second type of information is task and subtask information. Tasks have prompts, ranges, possible fillers, names, subtasks, etc. A task specified according to the task oriented dialog model generally has many tasks and subtasks. Information thus is supplied about each task and subtask. Preferably, there is one display screen to collect task and subtask information from; the task designer, which can be repeated for different subtasks.

To demonstrate the benefit of the development tool in accordance with the present invention, a comparison can be made to a state oriented development tool. A state oriented dialog tool is organized around collection of three kinds of information that are entered in order to define a dialog. First, there is information about states. States have prompts, possible user responses, and possible system actions to the responses. Secondly, there is information about prompts for the states. Third, there is information about variables.

"Model-level" information is generally of two types. Some sentences, sets of sentences and phrases are task-independent in that the Dialog Manager may use them at many points of the dialog. Some sentences and phrases have default specification, but also some that relate specifically to the task are to be supplied by the task-designer. For those with defaults, the intention is to allow the task designer to override the defaults. Preferably, there are at least six default messages that can be overridden, and more preferably there are approximately fifty default messages that can be overridden. Examples include the sentences the Dialog Manager uses to say hello and goodbye, and phrases used in diagnostic messages, e.g., "you must have" and "do you want". Existing state oriented development tools do not allow default messages in.this fashion to become a part of the task model description, nor can they be overridden.

A second type of "model-level" information is the specification of prompts for task-independent states. Task-independent states are similar to states defined in accordance with a state-oriented dialog model; however, a state oriented approach treats states that are task specific the same as states that are not task specific. In accordance with a preferred embodiment, there are five task-independent states, such as the "greeting" state where the caller is given an opportunity to obtain some general help, and the "confirm_value" state for confirming the value of a task's filler. There is thus no notion of entering user responses and system actions for these states since the anticipated user responses and the system's behavior are fixed in the task-oriented Dialog Manager. The names of the task-independent states can also be fixed. Thus, in recognition that some states are common across widely variant task descriptions, these states are built into the framework of every task-oriented object output from the development tool, for the Dialog Manager to handle.

Other "model-level" information includes specification of the top-level task, an indication whether or not the entire top-level task is to be confirmed or not and specification of "definitions" or explanations for terms, which may or may not be names of tasks or fillers in the model. These miscellaneous items generally relate to the top-level task project-level, but could also relate to other subtasks identified as high priority.

A description based on tasks and subtasks differs from a description based on states in many ways. For example, tasks have many associated items of information that a state oriented development tool does not collect. In a preferred embodiment, there are thirteen items of information that are collected for a task or subtask, only a few of which are generally collected to define a state. Further, for a given state, a designer has to specify the next-state transition, whereas in the present invention, the dialog is managed by the Dialog Manager and the next-state transition property is not needed. Thus the display screen in accordance with the present invention allows a designer to enter the following information.

Tasks may have subtasks, and in a preferred embodiment, at least one task must have at least one subtask. The subtasks of a task have a default ordering, which must be specified, either explicitly or implicitly. The specification of subtasks of tasks is integral to the structural definition of a task model in accordance with the present invention. Tasks also have a range, i.e., a minimum (min) and maximum (max) number that can exist. If the min equals the max, the range is converged, and the task is said to have one number. Examples include the following: In Example 1, min=1, max=1. This indicates the task is required, and there is exactly one of it. In Example 2, min=0, max=1. This indicates the task is optional, and there is at most one of this task. In Example 3, min=3, max=3. This indicates that the task is required, and there are three of these tasks. In Example 4, min=1, max=2. This indicates the task is required, and there may be one or two of this task. In Example 5, min=0, max=3. This indicates that the task is optional, and that there is at most three of this task.

Tasks also have possible fillers, i.e., values that can fill the purpose of the task. For example, "small" can fill the size subtask for a drink, and cities with airports can fill both the origin and destination subtasks for a flight. Thus, the development tool in accordance with the present invention can be used to specify the labels of fillers, by setting a user response to a variable which is defined to have as possible values the possible fillers. There is also a way to associate "print names" with fillers. The label of the filler, supplied when it is defined as a variable value, is the form that the NLI (Natural Language Interpreter) is expected to return for that value. But the task designer may prefer to have the Dialog Manager use a different name when it refers to the value in one of its outputs. For example, the values of the fillers for a sandwich task may include "tuna salad", but it may be preferable to have the Dialog Manager refer to this as "tuna salad sandwich".

Tasks also have prompts. If the task's range is not converged i.e., if the min and max of the range are not the same, there is a number prompt ("how many"). If there is more than one possible filler, there is a filler prompt ("which one"). There can also be help prompts for both the number and filler cases. In addition, there is a "choices" prompt. The task-oriented Dialog Manager either has or is able to dynamically create defaults for all of these prompts, but the designer can also override some or all of these defaults, if the designer wishes. In a preferred embodiment, there will be alternate versions for the number and filler prompts (for users who need more, or less, information), and also for the number and filler help prompts, which will increase the number of prompts available to a designer. Also, preferably, since the task-independent states don't have ranges and fillers, labels that are appropriate for the "task-independent state" prompts are not the same labels that are used for the task prompts. Thus, preferably, when the designer specifies information about task-independent states, these two types of labels are not displayed concurrently.

Tasks may also have replies. A reply may be associated with the successful elicitation of either or both of a task's or subtask's number or filler. Like prompts, replies may contain references to filler values, which is like a variable reference i.e., the reply can change based on input to the Dialog Manager. This can be specified with the development tool. The development tool can also handle the specification of a reference to a number or a minimum or maximum from a range as part of a reply.

Tasks also have prefixes, which are used both for input disambiguation and output generation. For example, the prefix for a trip destination would likely be "to"; the prefix for the bread subtask of a sandwich could be "on". The Dialog Manager can use these prefixes not only to communicate with respect to a task, but also to distinguish user input. For example, if a user inputs Boston, the Dialog Manager can ask "to or from", or if the input is "to Boston", the Dialog Manager can characterize the information as the destination.

Specification of prefixes for some tasks is not preferable. For example, "sound and feel" can be awkward to say "drink" <x> "small" for any possible prefix <x>. It is more natural to say "small drink". Therefore there is a box to check in the development tool display to tell the task model that the subtask is to be output as a left-modifier (<filler-name><owner-name>) rather than in the usual manner (<owner-name> <task-prefix><fillername>).

Tasks may, also have names. By default, the name of a task is the label used to create the task in the first place. But the designer may also supply a name to be used by the system when mentioning the task. For example, the task 'side' in the diner prototype has the name 'side order' which the Dialog Manager uses when referring to that task.

A task may also be marked to have the value of its filler confirmed, as a property of the task.

A task may also be marked to have its filler confirmed as a subtask of the task. This option, mutually exclusive with the previous option, is generally for the situation where the task already has subtasks.

A task with a maximum greater than one may be marked that all its fillers must be unique. This option is for specifying a case like a pizza-toppings specification. Ignoring double toppings, generally multiple toppings can be specified; this option prevents duplication where it would be in error. For example, where one would specify mushrooms, pepperoni and green pepper, this option would prevent, mushrooms from being entered twice, pepperoni from being entered twice, etc.

A task may also have a default filler. This can be specified via the development tool via use of a default value check in the display screen. When a default filler is specified, the caller may volunteer any other possible filler, but the Dialog Manager will use the default filler rather than explicitly prompt for the value of the task.

A task ray also have a default range. Default ranges are used in a manner similar to default fillers. A user may wish to specify a range beyond the default range and the user may do so, but an advantage of a preferred implementation of the present invention is that the Dialog Manager will proceed in accordance with the default range in the absence of a user specification.

A development tool for a task model is distinct from a development tool for a state model, since the models are different. Only a few of the above thirteen items are specifiable in state oriented development tools. Further, information, such as next state transition information, specified for states in state oriented development tools is not specified for a task in accordance with the task model. Thus, the development tool in accordance with the present invention allows flexibility of task description through specifying a task structure and task properties, without requiring a complex and difficult callflow specification Another way of viewing the information that is handled by the development tool is by characterizing the importance of the information to the structure of the task model, and in accomplishing the task. The information can be divided into information that must be specified for the task-oriented dialog model to be effective, desirable extra information that aids the subsequent dialog and optional information. Technically, there is no difference between the latter two categories, but some information can be more pertinent to the description of a task structure than other information. A display, e.g., can be arranged to reflect these varying levels of structure.

As to information that must be specified for a task description, the rolesets of all tasks that have structure need be specified. A top level task with some structure must be specified. A range for each role-set must be specified. A list of possible fillers for each role-set must be specified. Fillers can be atoms or functors. Atoms are used as the labels for discrete values, e.g., 'cola', 'root beer', and functors are used for data types, e.g., date(__), time(__). Fillers are themselves subtasks. They may or may not have additional structure, i.e., rolesets. The fillers/tasks for a single role-set may be a mixture of structured and unstructured subtasks. There is also a set of "task-global" messages that must be specified.

As to information that is desirable extra information, but not necessary, each filler/task and each roleset can have a name to be used by the system for output purposes. If a name is not specified, the default is the filler/task label or the roleset label, respectively. Each role-set can have a prompt for its filler. If one is not specified, in a preferred embodiment, the default is 'What <roleset-name> do you want?' Each role-set whose range is not converged (min=max) can have a prompt for its number. If one is not specified, in a preferred embodiment, the default is 'Do you want a <roleset-name>?' if the range is [0,1], and 'How many <roleset-name> do you want? Please say a number between <min> and <max>.' otherwise. Prompts can include references to fillers or numbers that are known at the time the prompt is issued. Prompts may also include references to minimums and maximums (from the range) of role-sets.

Each role-set can have a "prefix", which is used before outputting the name of its filler in a status report. For example, the prefix for the destination in a travel application can be 'to'. If one is not specified, in a preferred embodiment, the default prefix is 'a'. For a role-set that represents a property rather than a component, it may be more natural to output the name of the filler in a status report as a left modifier of the role-set's owner. Such a role-set may be specified as 'left modifies owner'. Thus, as described previously e.g., a status report can mention a 'small Pepsi' rather than a 'Pepsi with small'. Such role-sets can still have a prefix for use in acknowledgment messages, etc.

As to further optional information, the top level task may be specified as 'confirmation requested'. If so, at task completion the system conducts a confirmation dialog for the task as a whole. Any role-set may be specified as 'subtask confirmation requested'. If so, the system will conduct a confirmation dialog for the subtask headed by the role-set's filler. This only makes sense if the subtask has some additional structure i.e., additional subtasks. Any role-set may be specified as 'filler confirmation requested'. If so, the system conducts a confirmation dialog when the role-set's filler is elicited. Any role-set may have a help message associated with its filler, and any role-set whose range is not converged may have a help message associated with its number. If help is requested for a role-set's filler or number, and no help message has been specified, in a preferred embodiment, the system outputs the prompt for the role-set's filler or number again.

Further, any role-set may have a system reply output after the role-set's range is successfully converged, and a system reply output after the role-set is successfully filled. The default in a preferred embodiment is to have no system replies. System replies may include references to fillers or numbers that-are known at the time the reply is issued. They may also include references to minimums and maximums (from the range) of role-sets. Any role-set may have a choices message. In a preferred embodiment, the default is to list the names of the possible fillers of the role-set. However, the choices message overrides this default, and is particularly appropriate for role-sets which are to be filled by data types (e.g., dates, times, etc.) rather than discrete values (e.g., apple, orange, pear, etc.). Also, any role-set may be specified to require unique fillers. If so, the system will enforce such a restriction by not allowing repeat inputs. For example, multiple pizza toppings may be allowed, but each one must be different (you can't have pepperoni twice).

Additionally, a default filler may be specified for any role-set. If this is done, the user may volunteer any other possible filler for the role-set, but the user is never explicitly prompted to choose a filler for the role-set. For example, the task designer can specify that everybody gets a large drink unless specifically requested by the user otherwise. Also, a default number may be specified for any role-set. If this is done, the user may volunteer some other number, but never is explicitly prompted to supply a number for the role-set. For example, the task designer can specify that no drink is ordered unless a user specifically requests a drink. Optionally, any atom (character string) may have a definition message. Tasks and role-sets do not have definitions as tasks and role-sets. In a preferred embodiment, without a definition, the system responds 'Sorry, I don't know' when asked for a meaning.

Task-global messages are also input in accordance with the present invention. In a preferred embodiment, every system has a specification for six types of task global messages: greeting welcome, status prefix, must have prefix, unavailable prefix, task completion, and confirmation stop. The greeting_welcome message is issued at the start of a new session. The status_prefix text is inserted at the start of each status report. A default status_refix text can be "You have". The must_have_prefix text is inserted at the start of messages disallowing omission of required role-sets. A default must_have_prefix text can be "You must have". The unavailable_prefix text is inserted at the start of messages disallowing certain fillers. A possible default unavailable_prefix text is "You can't have". The task_completion message is issued when a session successfully completes an instance of the top level task. The confstop_hank_you message is issued when the system successfully confirms the user's intent to terminate the session. A possible default confstop thank_you message is "Goodbye."

A seventh message can be used when any roleset is specified to require unique fillers. The. already_have_prefix message is issued when the system disallows specification of an additional copy (or copies) of a filler for a role-set whose fillers must be unique. A possible default already_have_prefix message is "You already have".

In addition to the above task independent messages, in a preferred embodiment, every system has at least five task-independent compartments, each of which has at least an initial prompt. A compartment is a task that is completed in addition to task specific tasks, although not every compartment need be used or carried out by the Dialog Manager. A compartment can help smooth a conversation for which unanticipated events may have occurred. For example, a greeting helps begin a conversation and move it in a certain direction. A confirmation helps make sure that no misunderstandings have occurred.

Each compartment can have any or all of initial, expert, verbose and help prompts. An initial prompt is used when the compartment task is first executed by the Dialog Manager. An expert prompt is for when the initial prompt has been used, and superfluous information is to be avoided. A verbose prompt is a generally more wordy and more precise rendition of the initial prompt and a help prompt is for instructing a user needing help. The Dialog Manager has built in methods for executing a compartment in accordance with the prompts. Preferably, if the system attempts to issue a help prompt, but one has not been specified, the verbose prompt is used instead. Similarly, if the system attempts to issue an expert or verbose prompt, but one has not been specified, the initial prompt is used.

Also included in the category of task global messages are five task-independent compartments as follows:

First, there is a greeting compartment. The system enters the greeting compartment at the start of a new session. The intent is to give the user a chance to ask for directions before proceeding to the top level task. Therefore it is strongly recommended that a "help" prompt be specified for this compartment. Suggested defaults for the prompts for this compartment are: Initial prompt—"If you would like instructions on the use of this system, say HELP, otherwise say CONTINUE". Expert prompt—"Help" or "continue". Help prompt—"Besides answering the system's questions, you may perform one of the following actions at any time. You may ask for the CHOICES for answering a question. You may ask for the STATUS of the session so far. You may ask the system to make a CORRECTION. You may ask the system for HELP. You may ask the system to REPEAT what was said. You may ask the system to START OVER. And you may ask to STOP the session."

Second, there is a confirm_task compartment. The system enters the confirm_task compartment if the top level task is specified as 'confirmation requested'. A status report is generated before the prompt. Suggested defaults for the prompts for this compartment are: Initial prompt—"Is that correct? Please simply say YES, or make corrections one at a time." Expert prompt—"Is that correct?"Help prompt—"If your order is correct, say YES; otherwise make corrections one at a time."

Third, there is a repair task compartment. The system enters this compartment if the user says "no" in response to a confirm_task prompt. The system assumes that one or more corrections are needed. Suggested defaults for the prompts for this compartment are: Initial prompt—"Please make corrections one at a time." Help prompt—"In this system, you make corrections by saying either Correction, <value>, for example, Correction, root beer or Correction, no <value>, for example, Correction, no drink".

Fourth, there is a confstop compartment. The system enters this compartment if the user asks to terminate the session. Before hanging up or stopping the system attempts to confirm the user's intention. Suggested defaults for the prompts for this compartment are: Initial prompt—"The system recognized a request to stop the session. If you do want to stop, please confirm by saying STOP. If you want to continue, say CONTINUE." Expert prompt—"Stop" or "continue".

Fifth, there is a wrapup compartment. The system enters this compartment after successfully completing an instance of the top level task. The intent is to give the user the opportunity to start another instance of the top level task or not. The wording of the prompts will generally depend on the nature of the top level task.

In addition to the above five task-independent compartments, every system has an additional task-independent compartment, "confirm_value", but prompts do not need to be specified for the confirm_value compartment. The system generates them automatically via the Dialog Manager.

II. Effective Grammar Development

Having specified a dialog design in accordance with the task-oriented dialog model, the development tool allows the designer to simulate calls with prospective callers. After many simulations with actual callers, a gamut of responses can be gathered. This is the type of input that allows the designer to write effective grammars for a specific task. Thus, the development tool also allows a designer to specify a grammar for the specific task.

For the following explanation, the character strings used to specify tasks/fillers and roles are referred to as names, owner-task/role pairs are referred to as role-sets and role names need not be unique across all role-sets.

Unless a grammarless recognizer is being used, the task description implicitly implies the existence of the following grammars. Note that all of these grammars are expected to accept the "universals", i.e., 'status', 'choices', 'repeat', 'help', 'stop', 'start over', and 'optout'. Also, any grammar may contain specifications to accept requests for definitions or further information for any terms chosen by the designer. The Dialog Manager can accept additional variations of responses beyond the variations included in any particular grammar specification.

As to role-set grammars, for each role-set in the task model, there needs to be a grammar for accepting responses that supply a value for the filler of the role-set. If the role-set has an unconverged range (i.e., [min,max] with min<max), the grammar must also accept a response supplying the number for the role-set. For a range of [0,1], this can simply be "yes or no". The role-seit grammar may also contain specifications of other values that a user is allowed to volunteer, and specifications of corrections that the user is allowed to make.

For an example, the grammar for the order:drink role-set in the diner order task example needs to accept inputs like the following, returning the bracketed information to the Dialog Manager: "Yes, I want a drink."—[yes], "Pepsi, please."—[value(pepsi)] and "I'll have a small root beer."—[value(root beer), value(small)], etc.

The grammar may also accept inputs like the following, returning the bracketed information to the Dialog Manager: "Cancel the cole slaw."—[correction, not(cole slaw)], "I want a different side order."—[correction, change(side order)], etc.

As to filler confirmation grammars, for each role-set in the task model that has been marked to have its filler confirmed, there needs to be a grammar that accepts responses to the confirmation prompt. This grammar should accept "yes" or "no", a restatement of the pending value, a mentioning of any substitutable value, etc. It may also include specifications of requests to change the owner's value, as illustrated in the following example. Suppose the diner order task example has proceeded as follows as a result of confirming bread choice: First, from the user, "I want a turkey sandwich on rye."—[value(turkey), value(rye)]. Second, from the Dialog Manager, "Rye, right?" In this case, the confirmation grammar should accept inputs from the user such as: "Right."—[yes], "Nope."—[no], "Rye."—[value(rye)] or [yes], "I said white."—[value(white)] indicating substitution desired by the user. The Dialog Manager should also accept from the user: "Make that tuna salad on rye."—[value(tuna salad), value(rye)], "No, whole wheat."—[no, value(whole wheat)], "Not rye, white."—[correction, not(rye), value (white)], etc. Thus, a confirmation grammar can be used in accordance with the present invention.

As to subtask confirmation grammars, for each role-set in the task model that has been marked to have all subtask values confirmed, there needs to be a grammar that will accept responses to the confirmation prompt. This grammar accepts "yes", while it may or may not accept "no", and the grammar accepts corrections to any of the values in the subtask. The grammar preferably does not accept corrections to any other values in the overall task, or volunteered values for role-sets outside of the subtask.

If a subtask confirmation grammar accepts a "no", i.e., the task/grammar designer feels that the user is likely to respond to the confirmation prompt with a'simple negative, then the Dialog Manager will transition to a repair_task compartment as described above. Subtask repair grammars are described below. For example, in response to a prompt such as, "A flight from Boston to Denver. Is that correct?", the Dialog Manager can accept responses such as: "Yep."—[yes], "No, from Houston."—[correction, value(from (Houston))], "The destination is incorrect."—[correction, change(destination)], etc.

As to subtask repair grammars, for each role-set in the task model that has been marked to have all subtask values confirmed, and whose subtask confirmation grammar for the role-set accepts a "no", there needs to be a grammar that will accept responses to the second confirmation prompt. The requirements for this grammar can be similar to those for the subtask confirmation grammar, except that "yes or no" is not recognized, while "continue" is recognized. "Continue" is the token returned if the user decides that no corrections should be made. Because of the similarity between the two grammars, it may be sufficient in a simple case to have one grammar for a role-set's subtask confirmation and repair.

The following, exchange between user and system is an example that clarifies the "continue" case: System says, "A flight from Boston to Denver. Is that correct?" User says, "No."—[no]. System says, "Please make corrections one at a time." User says, "No, it's OK."—[continue].

As to an entire task confirmation grammar, if the top-level task is marked for confirmation, there is:a grammar that accepts responses to the confirmation prompt. Since such a prompt invites the user to correct anything in the task, the implied grammar may be too complex to allow use of entire task confirmation, unless the prompt can direct the user into one of a relatively small set of responses. For instance, if all responses can be channeled into the form "change,(role-set-name)", disallowing mention of filler values, it may be possible to use entire task confirmation. Whether the use of entire task confirmation is practical for a particular task or not depends on the complexity of the task, but in any event, the requirements on a, grammar for entire task confirmation are the same as those for a subtask confirmation grammar described above.

As to an entire task repair grammar, if the top-level task is marked for confirmation, and the entire task confirmation grammar accepts a "no", there is a grammar that accepts responses to the second confirmation prompt. As a comparison, the entire task repair grammar bears the same relation to the entire task confirmation grammar as a subtask repair grammar bears to the corresponding subtask confirmation grammar.

As to task-independent compartment grammars, there are three grammars, one for each of the task-independent compartments greeting, wrapup, and confstop. In each case, one of the "primary" responses is the same as one of the "universal" responses. In particular, for the greeting compartment, the "primary" responses should be mapped to either "help" or "continue". For the wrapup compartment, the "primary" responses should be mapped to either "stop" or "continue". And for the confstop compartment, the "primary" responses should be mapped to either "stop" or "continue". In a preferred embodiment, task-dependent values and corrections are not accepted by any of these three grammars.

III. Sound Files and Utterances

Having specified a dialog design in accordance with the task-oriented dialog model, the development tool allows the designer to specify actual sounds for a user to hear from the Dialog Manager. As output from the Dialog Manager, there are sound files and utterances representing dialog content. This is the type of input that the designer enters to provide a user friendly experience that can simulate a dialog with a human representative. The sounds and utterances do not, however, need to be completely specified by the designer since the Dialog Manager can string together sound files, and some sounds and utterances are standard.

For the following explanations with respect to sound files and utterances, the character strings used to specify tasks/ fillers and roles are referred to as names, owner-task/role pairs are referred to as role-sets and role names need not be unique across all role-sets.

A. Sound Files

The task description implicitly implies the existence of the following sound files: prompts, names, prefixes, help, system replies, choices explanations, definitions, task-global messages and task-independent messages and message fragments.

As to promptssound files, for each role-set, a prompt exists for the filler of the role-set. If this prompt is atomic, the corresponding sound file is named in general as: <owner-label>-<role-label>-filler-prompt. The composite prompt case is discussed after the next paragraph.

For each role-set with an unconverged range (i.e., [min, max] with min<max), there is a prompt for its number. If this prompt is atomic, the corresponding sound file is named: <owner-label>-<role-label>-number-prompt.

For each of the above, the prompt may also be composite (made up of pieces), rather than atomic. A piece may be (1) an atom containing no words, e.g. "?", in which case there is no corresponding sound file, (2) an atom containing words, in which case the sound file is named: <owner-label>-<role-label>-<type>-prompt <n>, where <n> is the ordinal number of this atom (counting only word-containing atoms), and <type> is either 'filler' or 'number', (3) a list of the form <type>(<another-owner-label>: <another-role-label>), where either <type> is 'filler' and the output involves the name of the filler (see Names below), or <type>is 'number', 'min', or 'max', and the output involves sound files specified by a special utility object for numbers.

As to names sound files, for each filler that can potentially fill a role-set, there is a name for the filler. If the filler is a member of a set of discrete values, e.g., 'cola' or 'root beer', the corresponding sound file is named <filler-name>-name. The content of this file may be a name explicitly specified in the task description, or the default name, which is the filler's label in the task description. In either case, the sound file name corresponds to its content. If the filler is a data type (current possibilities are dates and times), the output involves sound files specified by a special utility object for dates or a special utility object for times.

For each role-set, there is a name for the role-set. The corresponding sound file is named <role-name>-name. The content of this file may be a name explicitly specified in the task description, or the default name, which is the rolesets label in the task description. In either case, the sound file name corresponds to its content.

As to prefix sound files, for each role-set, there is a prefix that precedes the name of its filler or the name of the role-set, in the case where the range of the role-set has been converged but its filler has not yet been determined. The corresponding sound file is named <prefix>-prefix.

As to help sound files, for each role-set that has a help message/prompt associated with its filler or number, there is a help prompt. The corresponding sound file is named <owner-label>-<role-label>-<type>-help, where <type> is either 'filler' or 'number' as appropriate.

As to system replies sound files, for each role-set which has a system reply associated with its filler or number, there is a reply, which may be atomic or composite. If atomic, the corresponding sound file is named <owner-label>-<role-label>-<type>-reply, where <type> is either 'filler' or 'number' as appropriate. When the system replies are composite, there are pieces. A piece may be (1) an atom containing no words, e.g. "?", in which case there is no corresponding sound file, (2) an atom containing words, in which case the sound file is named <owner-label>-<role-label>-<type>-reply_<n>, where <n> is the ordinal number of the atom (counting only word-containing atoms), and <type> is either 'filler' or 'number' or (3) a list of the form <type>(<another-owner-label>:<another-role-label>), where either <type> is 'filler', and the output involves the name of the filler, or <type> is 'number', 'min', or 'max', and the output involves sound files specified by a special utility object for numbers.

As to choices explanations sound files, for each role-set that has an explicit "choices explanation" provided by the task designer, there is an explanation message. The associated sound file is named <owner-label>-<role-label>-choices.

As to definitions sound files, for each atom (character string) that has a definition provided by the task designer, there is a definition message. The associated sound file is named <character-string>-defn.

As to task global messages sound files, every system must have specifications for the six messages greeting_welcome, status_prefix, must_have_prefix, unavailable-refix, task_completion, and confstop_thank_you. If the system has a role-set specified to require unique fillers, a seventh message specification is needed, already_have_prefix. The associated sound files have the same names (i.e., greeting_welcome, etc.). Uses of*_prefix messages are discussed below under Utterances heading.

As explained previously, every system also has five task-independent compartments, greeting, confirm_task,: repair_task, confstop, and wrapup. As a consequence, every system must have specifications for from 5 to 20 prompts for these compartments i.e., the initial, verbose, expert, arid help prompts. The initial prompts are required, the others are optional. The associated sound files are named <compartment>_<prompt-type>(e.g., repair_task_verbose).

As to task-independent messages and message fragments sound files, every system assumes access to a small library of task-independent messages and message fragments. The uses of many of the fragments are discussed below under the Utterances heading. Example sound file names and some example content therefor include:

cannot_change_answer—"Sorry, I don't know what to change."

default_date_choices—"Any date from Jan. 1, 1000 to Dec. 31, 2099."

default_time_choices—"Any time of day, a.m. or p.m."

defer correction "Please wait with your correction."

did_not_understand—"Sorry, I didn't understand that."

did_not_understand about—"Sorry, I didn't understand what you said about"

do_not_know—"Sorry, I don't know."

do_you_want—"do you want"

do_you_want_a—"Do you want a"

for_the—"For the"

hold_for_rep—"Please hold for a representative."

how_many—"How many"

no_hear—"Sorry, I didn't hear your response."

ok_no—"No"

say_number between—"Please say a number between"

the_word_a—"a"
the_word_and—"and"
the_word_nothing—"nothing"
the_word_okay—"OK"
the_word_or—"or"
the_word_right—"right"
the_word_what—"what"
timeout—"The time limit for speech input has been reached. Timing out."
too_few_refix—"Sorry, you have to have at least"
too_manyprefix—"Sorry, you can't have more than"
unknown_filler—"unknown value"
unknown_maximum—"unknown maximum"
unknown_minimum—"unknown minimum"
unknown_number—"unknown number"
unknown_utterance—"Sorry, the system could not determine what to say."

B. Utterances

The task description provides explicit specification of many of the utterances that the Dialog Manager will issue in the course of processing a task. Some of these utterances are atomic, i.e., specified as a single character string; others are composite, comprised of pieces specified in the task description. Other utterances output by the Dialog Manager are constructed by the Dialog Manager. A few of these utterances are uses of the task-independent messages. Many are composite utterances, constructed from the sound files of names, prefixes, and message fragments discussed above. This section explains the construction by the Dialog Manager of some these composite utterances, with emphasis on the sound files employed.

As to utterances for prompts, if the role-set is a "differentiator", i.e., a copy of the role-set representing one of a multiple number of occurrences of the role-set, the prompt for its filler is preceded by an introductory phrase of the form "For the Nth <roleset-name>:". This is created using the sound files for_the, day_ordinal_<N>, and <role-name>-name. The sound file day ordinal_<N> is one solution. An alternate solution uses a special utility object for ordinal numbers.

As to utterances for default prompts, the utterance for the default prompt for a filler, 'What <roleset-name> do you want?', is achieved by sounding: the_word_what, then <role-name>-name and then do_you_want. The utterance for the default prompt for a number when the range is [0,1], 'Do you want a <roleset-name>?', is achieved by sounding: do_you_want_a and then <role-name>-name. The utterance for the default prompt for a number otherwise, 'How many <roleset-name> do you want?', is achieved by sounding: how_many, then <role-name>-name, then do_you_want, then say_number_between, then the minimum [specified by a special utility object for numbers], then the_word_and, and then the maximum [specified by a special utility object for numbers].

As to utterances for choices explanations, if the task description contains an explicit "choices explanation" for the role-set, the explanation sound file is played. Otherwise, if the role-set has a date or time for its filler type, the sound file message default_date_choices or default_time_choices, respectively, is played. Otherwise, a composite utterance is constructed by playing the sound files for the names of each possible filler (files named <filler-name>-name) in sequence. The file the_word_or is played just before the final filler name if there is more than one filler. An example is "Small, medium, or large."

As to utterances for status reports, these can be the most complex utterances generated by the Dialog Manager. This utterance consists of the status prefix followed by one or more "status fragments". Each status fragment is itself a composite utterance constructed as follows: If the user has not yet made any progress in the task, there is a special case where the_word_nothing is the sole status fragment. If the user has caused a role-set's range to be converged, but has not yet specified a filler for the role-set, the status fragment is the role-set's prefix followed by the role-set's name, i.e. the sound files <prefix>-prefix and <role-name>-name. In the usual case, the status fragment is the role-set's prefix followed by the filler's name, i.e. the sound files <prefix>-prefix and <filler-name>-name. A variation on this case exists for the case where the role-set has been specified as 'left modifies owner'. In this case the filler of any modifying role-set is played before the filler of the parent role-set, without use of the prefix for the modifying role-set. For example, if the size (of a drink) role-set is 'left modifies owner', a status report might be "You ordered a turkey sandwich on rye with side order with a large root beer", achieved by playing sound files: (1) status-prefix—You ordered, (2) a-prefix—a, (3) turkey sandwich-name—turkey sandwich, (4) on-prefix—on, (5) rye-name—rye, (6) with-prefix—with, (7) side order-name—side order, (8) with a-prefix—with a, (9) large-name—large and (10) root beer-name—root beer. If the status report is for a subtask, the role-set prefix in the first status fragment is replaced by the_word_a. For example, "You ordered a large root beer."

As to utterances for task and subtask confirmation prompts, the prompt issued to initiate confirmation of a task or subtask is a status report for the task or subtask, followed by one of the confirm_task compartment prompts (see e.g. "task-global" messages above). For example, "You ordered a large root beer. Is that-correct?" could be achieved by playing sound files: (1) statusprefix, (2) the-word_a, (3) large-name, (4) root beer-name and (5) confirm_task_expert.

As to utterances for filler confirmation prompts, the utterances for prompts issued to initiate confirmation of a filler are currently constructed as follows. If the prompt is an initial or expert prompt, it is the filler's name plus "right?", i.e. the sound files <filler-name>-name and the_word_right. An example might be "Boston, right?" If the prompt is a verbose or help prompt, it is the phrase "do you want" followed by the filler's name, i.e. the sound files do_you_want and <filler-name>-name. An example might be "Do you want rye?"

As to other informational and diagnostic utterances, these are additional utterances that can be output by the Dialog Manager. These additional utterances include reporting successful processing of a volunteered value, reporting an attempt to specify too few fillers for a role-set, reporting unsuccessful processing of an input value, reporting an attempt to specify too many fillers for a role-set, reporting rejection of a filler, reporting rejection of a role-set, reporting an attempt to reject a required role-set, reporting an attempt to specify an additional copy or copies of a filler for a role-set whose fillers must be unique and reporting an inappropriate value.

One such utterance relates to reporting successful processing of a volunteered value. When the Dialog Manager accepts a volunteered value, that is, a value other than the value for which the user was prompted, the Dialog Manager outputs an utterance acknowledgement that this occurred. There are two cases. If the value was a filler for a role-set, the utterance consists of the new role-set's prefix, the new filler's name, and the word "okay", i.e. the sound files <prefix>-prefix, <filler-name>-name, and the_word_okay. An example might be "with cole slaw, okay." If the value named a role-set, the utterance consists of the new role-set's prefix, the role-set's name, and the word "okay", i.e. the sound files <prefix>-prefix, <role-name>-name, and the_ word_okay. An example might be "with side order, okay." If the value named a role-set, and a quantity greater than one is specified, the utterance consists of the quantity followed by the role-set's name, i.e. files specified by a special utility object for numbers and the sound file <role-name>-name, e.g., "two drink."

Another utterance relates to reporting unsuccessful processing of an input value. When the Dialog Manager recognizes an input value as appropriate to the task domain, but inappropriate for some reason to the current task situation, it outputs an utterance consisting of the phrase "Sorry, I didn't understand what you said about" and the,proposed filler's name, i.e. the sound files did_not_understand_ about and <filler-name>-name. For example, if the user supplies a drink size before a drink has been ordered, the Dialog Manager responds, "Sorry, I didn't understand what you said about small."

Another utterance relates to reporting an attempt to specify too few fillers for a role-set. When the user is understood to have requested a number for a role-set that is less than the minimum specified in its range, the Dialog Manager outputs an utterance consisting of the phrase "Sorry, you have to have at least", the role-set's minimum, and the role-set's name, i.e. the sound files too fewrefix, files specified by a special utility object for numbers, and <role-name>-name, e.g., "Sorry, you have to have at least one sandwich."

Another utterance relates to reporting an attempt to specify too many fillers for a role-set. When the user is understood to have requested a number for a role-set that is greater than the maximum specified in its range, the Dialog Manager outputs an utterance consisting of the phrase "Sorry, you can't have more than", the role-set's maximum, and the role-set's name, i.e. the sound files too_many_ prefix, files specified by a special utility object for numbers, and <role-name>-name, e.g., "Sorry, you can't have more than one destination."

Another utterance relates to reporting rejection of a filler. When the user is understood to have failed to confirm a filler, or to have issued a correction for an existing filler, the Dialog Manager outputs an utterance consisting of the word "no" followed by the rejected filler's name, i.e. the sound files ok_no and <filler-name>-name, e.g., "no cole slaw".

Another utterance relates to reporting rejection of a role-set. When the user is understood to have issued a correction rescinding a specification for an optional role-set (by naming the role-set, not any filler it may have), the Dialog Manager outputs an utterance consisting of the word "no" followed by the rejected role-set's name, i.e. the sound files ok_no and <role-name>-name, e.g., "no side order".

Another utterance relates to reporting an attempt to reject a required role-set. When the user is understood to have issued a correction rescinding a specification for a required role-set (by naming the role-set, not any filler it may have), the Dialog Manager outputs an utterance consisting of the "must-have" prefix followed by the rejected role-set's name, i.e. the sound files must_have_prefix.and <role-name>-name, e.g., "Sorry, you have to have a destination."

Another utterance relates to reporting an attempt to specify an additional copy or copies of a filler for a role-set whose fillers must be unique. When the Dialog Manager recognizes a violation of a requirement that a role-set's fillers be unique, it outputs an utterance consisting of the "already-have" prefix followed by the proposed filler's name, i.e. the sound files already_have_refix and <filler-name>-name, e.g., "You already have pepperoni."

Yet another utterance relates to reporting an inappropriate value. When the Dialog Manager recognizes an input value as appropriate to a role-set not in the current task situation, but with the same name as the current role-set, it outputs an utterance consisting of the "unavailable" prefix, the prefix associated with the role-set filled by the current role-set's owner, the name of.the current role-set's owner, the prefix associated with the current role-set, and the input value's name. This specification allows the Dialog Manager to output a message such as "You can't have a grilled cheese sandwich on a kaiser roll."

IV. An Exemplary User Interface

Thus, the developer can specify the task model with a development tool as described above. In a first embodiment of the present invention, concepts of a task model having equal structure can be specified. This is because, as explained previously, for many applications, concepts for a roleset can all have equal structure. For example, specifying bread for a sandwich can have equal structure for concepts turkey, ham and cheese and roast beef i.e., there is no reason why bread can't have the same structure for all of these sandwich types, and thus there is no reason why the same structure can not be re-used.

Figure 4:
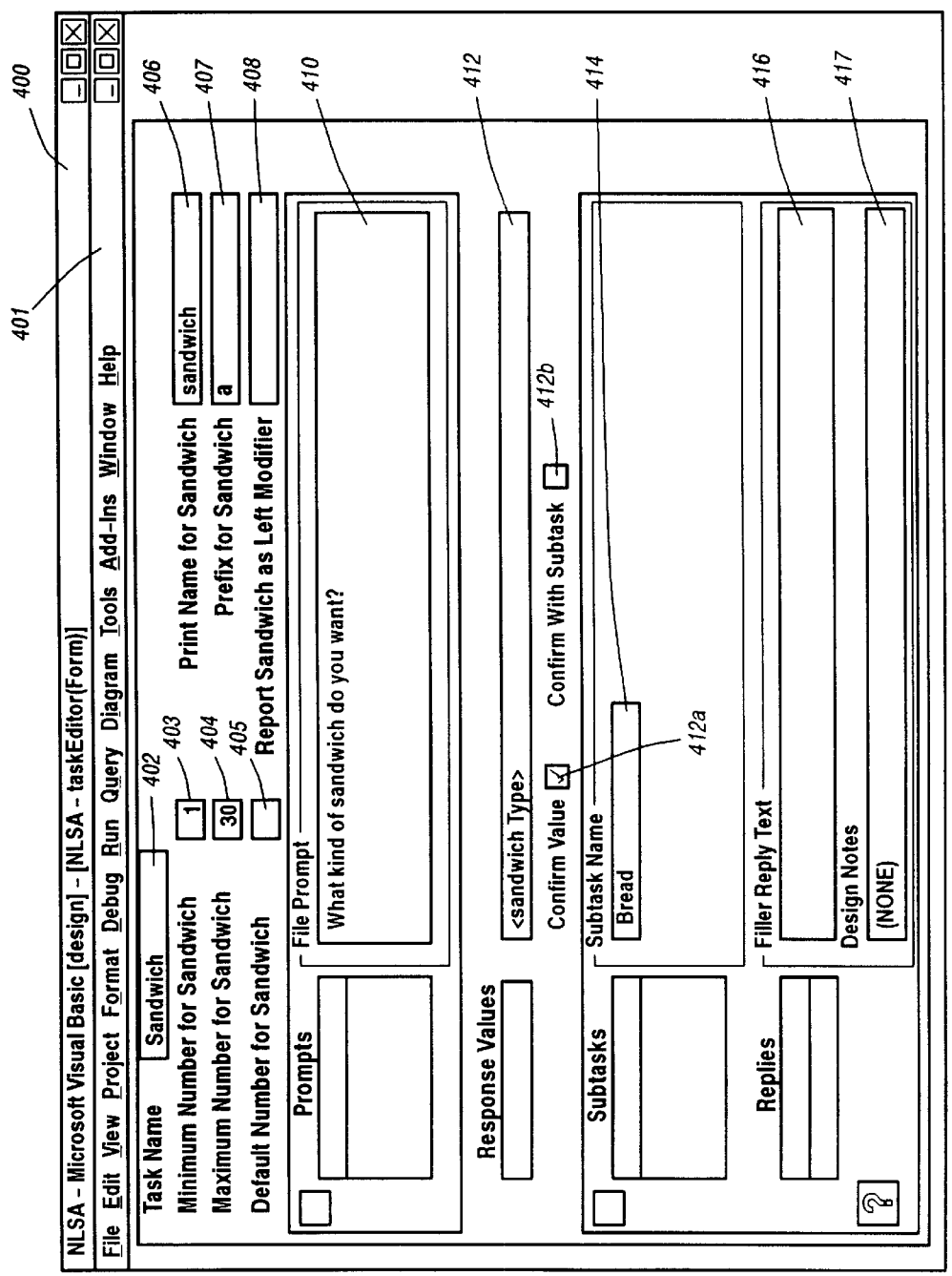
FIG. 4 depicts an exemplary screenshot for a first embodiment of a user interface for the development tool in accordance with the present invention.

FIG. 4 is an exemplary screenshot for a first embodiment of a user interface for the development tool in accordance with the present invention. A task editor window 400 is depicted. Window 400 has a tool bar 401 for file management, editing features and tools, window management, help, and the like. As can be appreciated from the example shown, when specifying a task, a task name 402, minimum number 403, maximum number 404, default number 405, print name 406, prefix 407 and left modifier feature 408 can be entered for the task.

Further, prompts can be specified as exemplified by filler prompt 410. Additionally, response values 412 can be indicated (the response values will be specified more fully in a filler builder interface, an exemplary version of which is described in the next paragraph), along with options to confirm value 412*a* or confirm with subtask 412*b*. These options are mutually exclusive and the user interface can enforce this by only allowing one. Subtasks 414 can be specified for the task at hand (under the simplifying assumption that all fillers have identical substructure). Replies 416 can also be specified. Notes 417 can also be recorded for the task.

Figure 5:
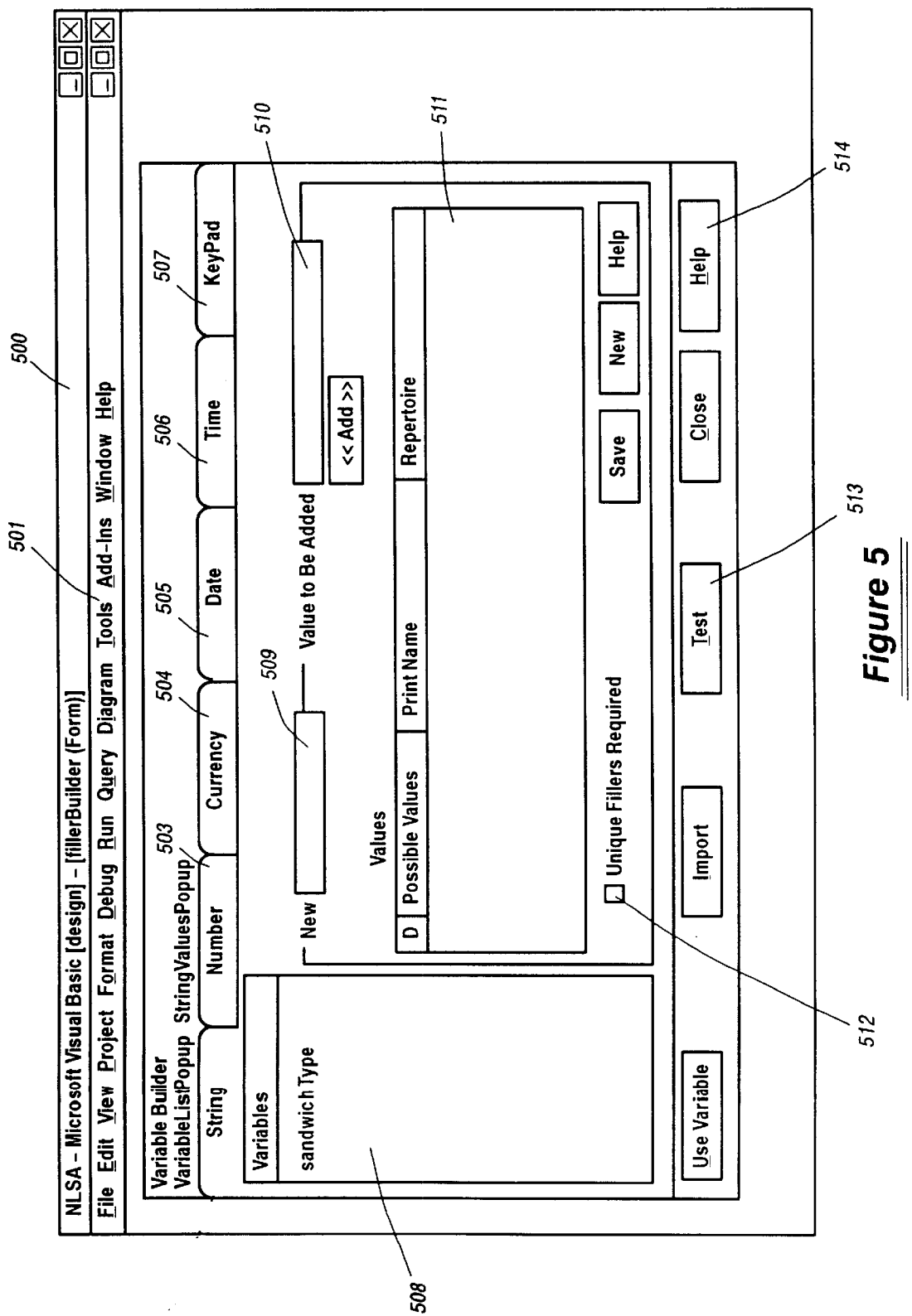
FIG. 5 depicts another exemplary screenshot for a first embodiment of a user interface for the development tool in accordance with the present invention.

FIG. 5 is another exemplary screenshot for the first embodiment of a user interface for the development tool in accordance with the present invention. A sample filler builder window 500 is shown. Window 500 has a tool bar 501 for file management, editing features and tools, window management, help, and the like. In a tabbed format, string subwindow 502, number subwindow 503, currency subwindow 504, date subwindow 505, time subwindow 506 and keypad subwindow 507 can all be brought to the forefront of the window 500 for data entry. String subwindow 502 is shown in FIG. 5. Variables can be listed in portion 508. New variables,can be entered in portion 509, with a value to be added 510. Values are listed in portion 51 . An option 512 is provided to make fillers unique. Additional options are also provided such as a test button 513, help button 514, further easing use of the development tool in specifying information.

Figure 6A:
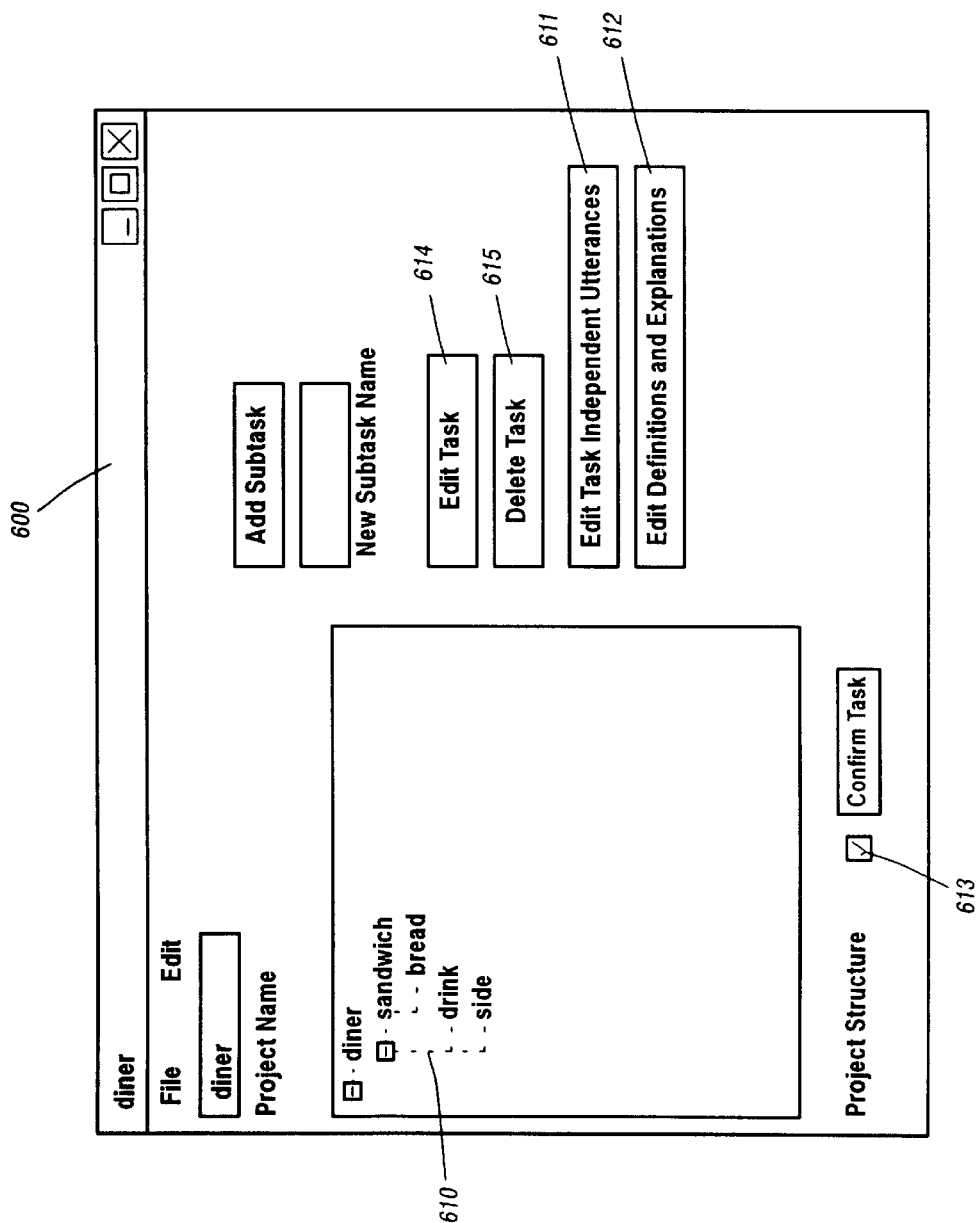

FIGS. 6A through 6E show exemplary screenshots of a second embodiment of a user interface in accordance with the development tool of the present invention. FIG. 6A illustrates an initial screen 600 for the second embodiment of a user interface in accordance with the present invention. A user is generally presented with this screen at the beginning of the specification of the dialog model. In this screen, the designer or developer defines a hierarchally structured task using the tree representation 610. From this screen, the designer has the options of editing the task independent utterances and editing the definitions and explanations by clicking on or inputting buttons 611 and 612, respectively. Global task confirmation can be selected by checking the 'Confirm Task' checkbox 613. If a task (corresponding to a roleset internally) is selected in the tree, the designer can then choose to edit or delete the selected task by clicking on or inputting buttons 614 or 615, respectively.

Figure 6B:
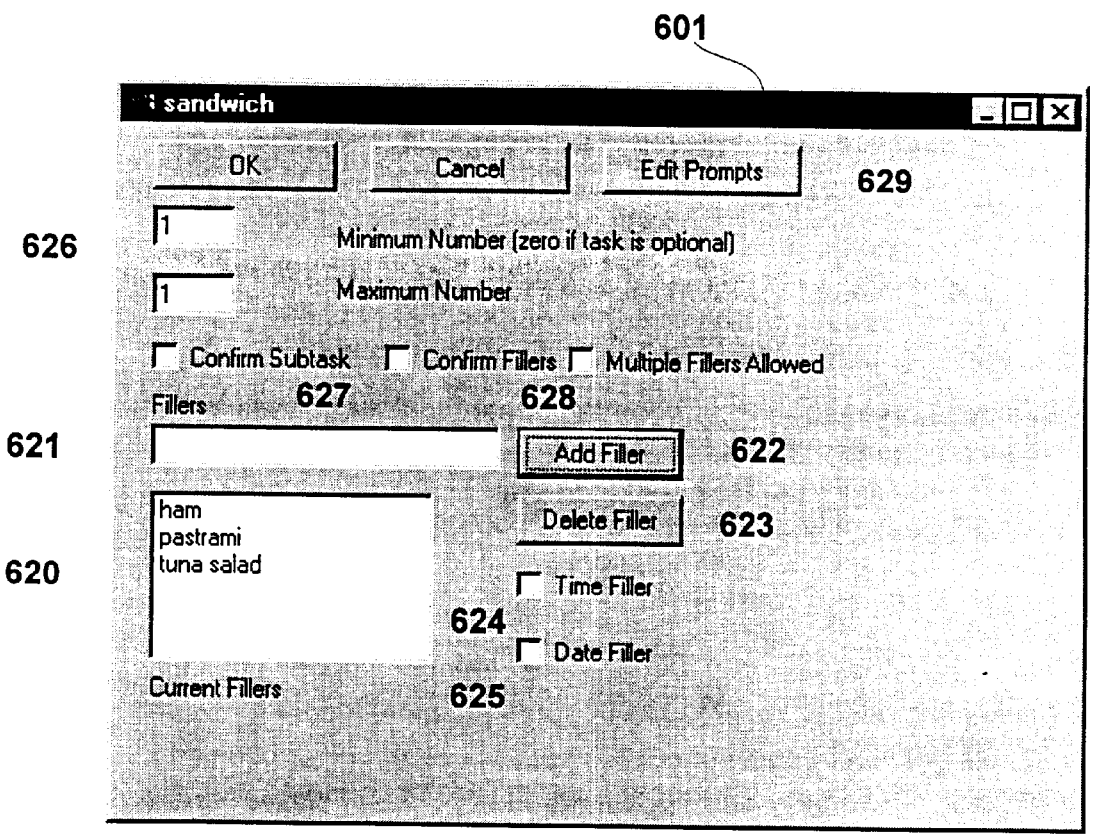

FIG. 6B illustrates a filler or 'Edit Task' screen 601 for the second embodiment of a user interface in accordance with the present invention. This screen is entered from the initial screen 600 by inputting the 'Edit task' button 614. This screen allows the designer to specify possible fillers for a task in box 621. Fillers can be added or deleted by inputting boxes 622 or 623, respectively. In:this screen example, the designer has entered three possible fillers for the sandwich task shown in the box 620. Time filler checkbox 624 or date filler checkbox 625 allow the designer to input a time or date filler, respectively. The designer also specifies the range 626, confirmations 627 and whether multiple fillers 628 are allowed from this screen.

Figure 6C:
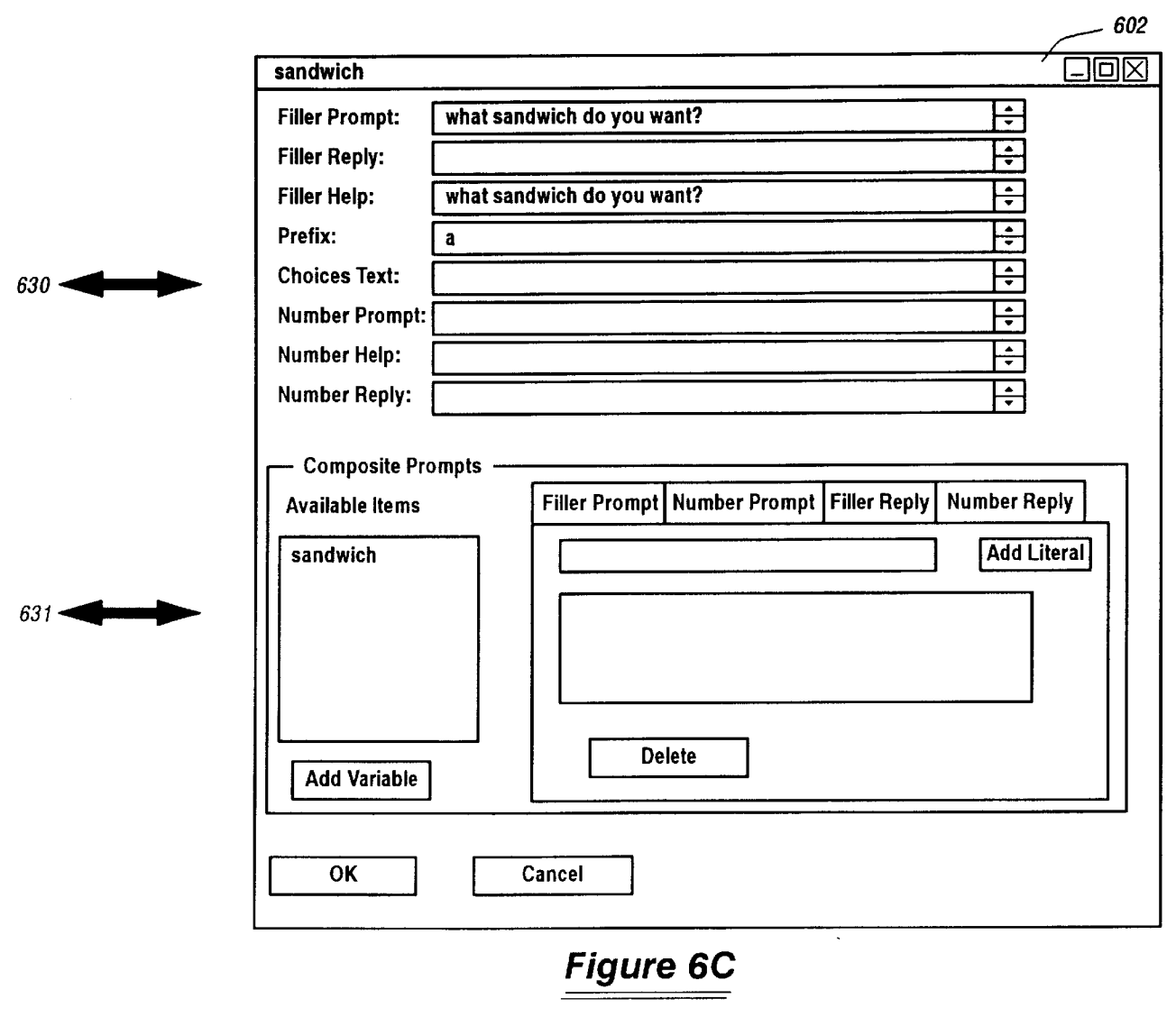

FIG. 6C illustrates a prompts screen 602 for the second embodiment of a user interface in accordance with the present invention. This screen 602 is entered from the 'Edit Task' screen 601 by selecting 'Edit prompts' 629. This screen 602 enables the designer to view the default prompts that will be generated for a particular task, and to modify them if necessary. Simple prompts 630 can be composed. Composite prompts 631 can also be composed, which allow reference to a variable that has been collected.

FIG. 6D illustrates a globals screen 603 for the second embodiment of a user interface in accordance with the present invention. This screen 603 is entered from the initial screen 600 by inputting the edit task independent utterances button 611. In this screen 603, the prompts displayed in the example screen are the defaults 640. The designer can edit these as desired to customize the prompts that will be used in the application.

Figure 6E:
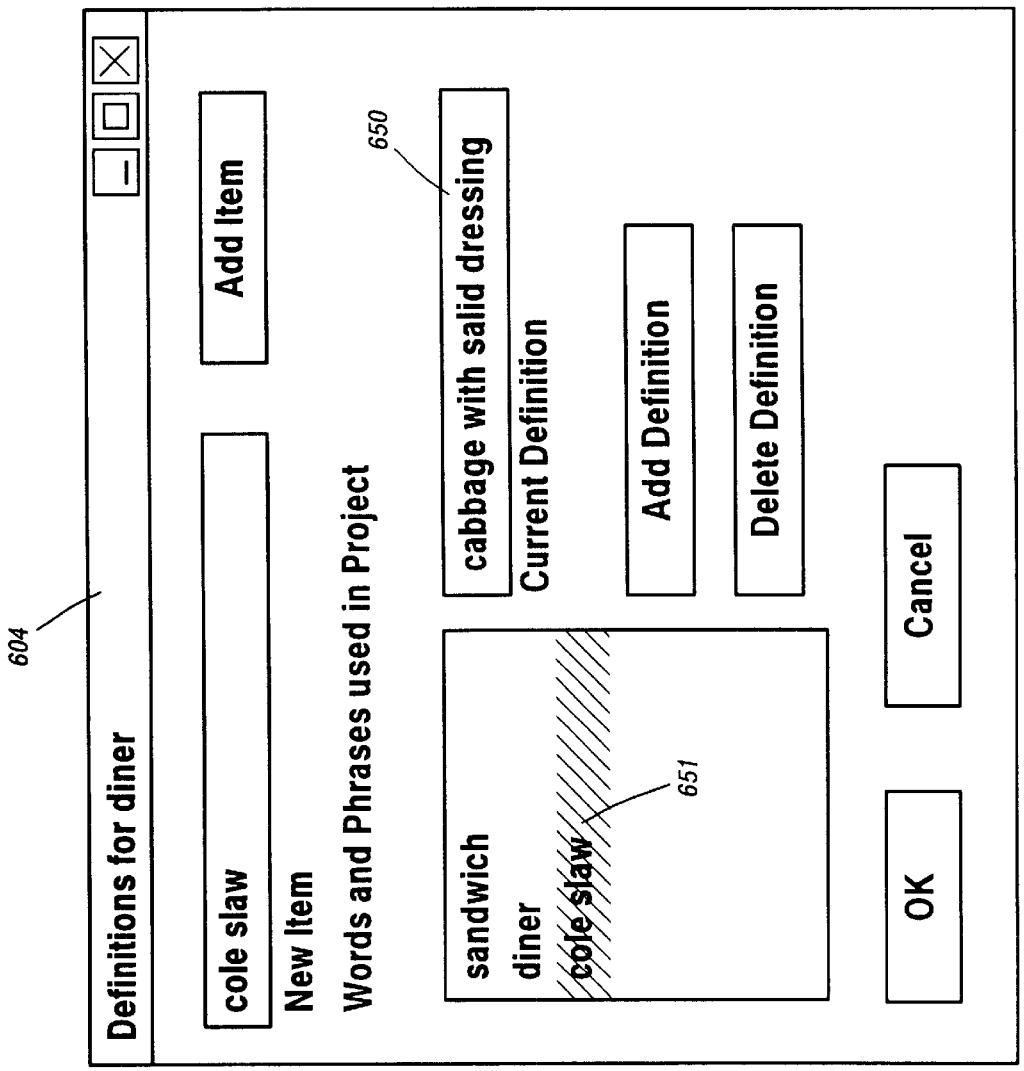

FIG. 6E illustrates a definitions screen 604 for the second embodiment of a user interface in accordance with the present invention. This screen is entered from the initial screen 600 by inputting the edit definitions and explanations button 612. In this screen a definition 650 can be provided for any word about which the designer believes a user might want more information. The system automatically finds the words and phrases used in the project and presents them in a list 651, but the designer can also enter any other word that might be used.

Although exemplary screenshots of two embodiments of a user interface in accordance with the development tool of the present invention have been described, it is abundantly clear that many different user interfaces are possible. Windows can be rearranged, data entry can be organized differently, pop-up or pull-down menus can be implemented. Buttons can be replaced with other inputs. The possibilities are limitless. It is generally the types of information that can be entered in accordance with the task-oriented dialog model of the present invention that make realization of the development tool of the present invention possible. Further, the development tool can be implemented on a Web page or pages to be accessed over the Internet, or any known computer-readable storage media.

Dialog Manager

Once the structure of the top-level task is set out according to this task oriented dialog model using a development tool for specifying the structure, the Dialog Manager carries out the dialog necessary to perform the task. In other words, having defined the top-level task with the task model, the Dialog Manager operates to conduct the dialog necessary to complete the top-level task.

In the run-time aspect of the invention, a user receives input from text-to-speech hardware/software or pre-recorded sound files, and responds to a voice receiver. A speech recognizer reduces the sound to words. These words are input to a Natural Language Interpreter (NLI) that reduces the words to a meaning that can be understood and processed by the Dialog Manager. Subsequently, the NLI may reduce the words to an input string. The input string is an argument and/or a parameter that can be interpreted by the Dialog Manager based on the task model. The Dialog Manager then ascertains concepts for rolesets that a user intends. Then, the Dialog Manager can output text based on this interpreted and processed user response through the text-to-speech hardware, for another iteration of user response, speech recognition, NLI, and Dialog Manager processing.

In a traditional Dialog Manager, the processor of the Manager typically acts to ascertain one piece of information at a time. In the present invention, the Dialog Manager can handle the answer to many different questions, out of sequence. Although it is technically possible to predefine a traditional Dialog Manager which can respond to out-of-sequence responses, due to the number of states which must be defined to accomplish this task and the complexity of each state, it is not practical to do this for any but the most trivial applications. Furthermore, as an inherent-part of every task model, the present invention employs disambiguators that can be applied when it is unclear what a user intends. This can happen, for example, when out:of sequence information can apply to different rolesets. Additionally, rather than require a separate confirmation roleset for each subtask, the Dialog Manager according to the present invention can confirm a roleset based on the task model without further specification. Thus, the Dialog Manager is a flexible processor of information and a processor of information flow which can conduct an interactive voice dialog to accomplish a top-level task based on a task model. Once completed, the task can be output to a database or other memory for later processing or storage.

Incidental to the description of the development tool in accordance with the present invention, many input types were described that can also be described from the side of the Dialog Manager. For example, although certain task properties, sound files and grammars are specified in accordance with the development tool, these descriptions are ultimately used by the Dialog Manager to 'conduct the dialog for completion of the top level task. In addition to inputs that are used by the Dialog Manager as described above, the Dialog Manager also has additional inventive features, such as the issuance of status reports regarding the state of the transaction or dialog, provided to the user in response to a request for the status. Or the ability to handle information provided by the user out of an ordinary sequence, so as to approximate the feel of a human dialog. Additional features of the Dialog Manager are described below.

I. Implementation and Features of Dialog Manager

The task-oriented Dialog Manager knows how to conduct a dialog, the purpose of which is to accomplish a top level task. A task involves a collection of hierarchicallystructured set of values. Examples of tasks include meal orders and travel reservations. The Dialog Manager must be supplied with a task model description, giving the values and their structure. The structures for possible models of a diner meal order and an airline reservation were given earlier.

A value is something that the user or Dialog Manager might want to talk or converse about from the task model description, e.g., sandwich, drink, tuna salad, root beer. The Dialog Manager knows how to deal with volunteered values, i.e. a user can supply values in addition to or instead of the value for which the Dialog Manager prompts the user.

The Dialog Manager also has task-independent capabilities including how to confirm a value or a task or subtask, how to start and end a session, how to respond to requests for help, how to start over, etc. As discussed previously, a task model description need not be concerned with these except at a relatively high level, i.e. what should be confirmed, or the content of help messages.

In a preferred embodiment of a runtime system, the Dialog Manager is implemented as a Java class called Session. The controlling software ('application') instantiates an object of the Session class, and passes to an initialization method the name of a task model description output from the development tool. There is one instance of Session per call or phone line, i.e. a Session does not switch between multiple calls.

Session takes as input a value (currently just a string) or a list of values. Session returns a list of strings and/or Utterances. Utterance is a Java class which makes available both a string to be used for text-to-speech and a list of strings to be interpreted as sound file names. Strings in the output are used for controlling other agents, e.g., ASR.

Inputs are assumed to be extracted from speech recognizer output by a natural language understanding module. The Dialog Manager assumes it can obtain all the information extracted from the user's input at the same time, i.e. a list of values.

Sample inputs are: (1) task-specific values, possibly with "semantic wrappers", e.g., 'pastrami', 'date(Apr. 1, 1999)', 'to(boston)', 'at(time(3:15 PM))', 'not(pepsi)', 'change (drink)', (2) 'yes' or 'no', (3) quantities, with or without values which they scope; e.g., 'qty(10)', 'qty(3, 'diet pepsi') ', 'qty(2, pastrami, rye)', (4)'correction', (5) 'continue', (6) 'defn(X)', requesting a definition of or information about X, (7) 'status', 'choices', 'choices(X)', 'repeat', 'help', 'stop', 'start over', or 'optout', representing natural language interpretation of the user's input and (8) 'nohear', 'lastnohear', or 'lostcall' (and possibly others), representing messages from the application based on agent behavior.

In a preferred embodiment, the Dialog Manager is implemented as four packages of Java classes as shown in Table I where indentation indicates a subclass relationship:

TABLE 1

| Four Java Packages | | | |
|---|---|---|---|
| dml | kr | utt | utils |
| Session | TaskDescription | BasicUtterance | List |
| Blackboard | Compartment: | Utterance | |
| Message | Concept | Definition | |
| ChoicesMsg | DateConcept | StatusReport | |
| ContinueMsg | SpecificDateConcept | | |

TABLE 1-continued

| Four Java Packages | | | |
|---|---|---|---|
| dml | kr | utt | utils |
| DefnMsg | TimeConcept | | |
| HangupMsg | SpecificTimeConcept | | |
| HelpMsg | RoleSet | | |
| LastNoHearMsg | Range | | |
| NoHearMsg | Instance | | |
| OptoutMsg | CurrentTask | | |
| PromptMsg | IndRoleSet | | |
| QuantityMsg | DiffRoleSet | | |
| RemarkMsg | | | |
| RepeatMsg | | | |
| ResetCptMsg | | | |
| StartOverMsg | | | |
| StatusMsg | | | |
| StopMsg | | | |
| ValueMsg | | | |
| MsgStack | | | |
| PendingValueMemo | | | |

In a preferred embodiment, Session handles I/O, knows how to traverse a task model instance, and has miscellaneous private utility methods. Session uses a Blackboard for "global" communications, and a stack of Messages for an agenda. The Blackboard is currently implemented as a hashtable and MsgStack is currently implemented as a list.

Session instantiates the task model (a TaskDescription) explicitly; this is not Java instantiation, but creation of a CurrentTask object which will "shadow" or mirror to some extent the TaskDescription object. Most of the subclasses of Message correspond to user inputs, and Session implements the appropriate system response to these inputs. PromptMsg, RemarkMsg, ResetCptMsg, and HangupMsg correspond to Dialog Manager outputs, i.e. they implement Dialog Manager actions by performing some module external to the Dialog Manager.

Messages are evaluated in order. Whether a prompt has been created can be ascertained by the Dialog Manager by checking the Blackboard. When the MsgStack is empty, if no prompt has been generated, Session traverses the CurrentTask instance for missing information, using a depth-first, left-to-right algorithm. Thus the task has a default ordering based on how the designer modeled it.

An instance of the PendingValueMemo class is put on the Blackboard to provide context for a filler confirmation sub-dialog and the appropriate continuation after its conclusion.

II. Sample Interface Specification for Dialog Manager

A. Sample Input Specification

In a preferred embodiment, the task-oriented Dialog Manager assumes the following conventions on its input, as received from the natural language interpreter:

1. value(V). A frequent input is an ordered set of one or more values, each wrapped with a "value( )" label. The actual value V is either an atom (like 'pastrami' or 'root beer'), a typed expression (such as date(Dec. 25, 1998) or time(1400)) or a "prefixed" expression (such as to(boston)). Types and prefixes may be combined, as in at(time(1530)).
2. Yes. This may appear as the response to a prompt for the range of an optional roleset, or as a response to a confirmation prompt for a value or a task. If it is a response to a range prompt, it may be accompanied by one or more values.
3. No. This may appear as the response to a prompt for the range of an optional roleset, or as a response to a confirmation prompt for a value or a task. If it is a response to a range prompt, it may be accompanied by one or more values. If it is-, a response to a confirmation prompt for a value (but not a task), it may be accompanied by a single value with the expectation that the value would substitute for a rejected value.

4. qty(N). This may appear as the response to a prompt for the range of a roleset whose maximum is greater than one.

5. qty(N, value(V)) This also may appear as the response to a prompt for the range of a roleset whose maximum is greater than one. There may be more than one value, allowing the quantity to scope all the values; thus "two tuna salad sandwiches on rye" can be specified as qty(2, value('tuna salad'), value(rye)). There may be multiple quantity expressions in the input list. For example, qty(2, pepsi), qty(3, sprite) specifies a total of five drinks.

6. correction. This input should be the first of an ordered set of 2 or more items; it should be accompanied by one or more values to add or substitute (value(V)), one or more values to reject (not(V)), and/or one or more values to replace (change(V)). It may also be accompanied by one or more values that are not changed, but merely "set context". For example, consider the following cases:
   (a) current order: tuna salad on rye possible utterance: no, tuna salad on WHITE input: correction, value('tuna salad'), value(white) result: tuna salad on white
   (b) current order: tuna salad on rye possible utterance: no, PASTRAMI on rye input: correction, value(pastrami), value(rye) result: pastrami on rye
   (c) current order: tuna salad on rye possible utterance: no, PASTRAMI on WHITE input: correction, value (pastrami), value(white) result: pastrami on white 7. not(V). This input should follow 'correction' in an ordered set of 2 or more items. If V is the name of a filler, it is-rejected and the user is prompted for a replacement. If V is the name of a roleset that has a filler, the filler is rejected and not replaced. Thus, for example, not(drink) is interpreted to mean that the user does not want any drink.

8. change(V). This input-should follow 'correction' in an ordered set of 2 or more items. If V is the name of a filler, it, is rejected and the user is prompted for a replacement. Thus, change(V) is the same as not(V) in this case. If V is the name of a roleset that has a filler, the filler is rejected, but the user is prompted for a replacement. Thus, for example, change(drink) is interpreted to mean that the user does not want the presently chosen drink (whatever it is), but does want some drink.

9. continue. This input is appropriate after the greeting__initial prompt (if the user doesn't want help), after the wrapup__initial prompt (if the user wishes to do another iteration of the top-level task), after a confirmation prompt for stopping the session (if the user doesn't want to stop), and in the repair__task compartment (if the user decides not to make a correction).

10. defn(V). This input, for an atomic value V, requests a definition; of V, or more generally, some information about V.

11. status. This input.token requests the system to output the status of the task in progress.

12. choices. This input token requests the system to describe the possible responses to the current prompt.

13. repeat. This input token requests the system to repeat the current prompt.

14. help. This input token requests the system to provide any other assistance available.

15. stop. This input token requests the system to terminate processing. Unless it is the response to a confirmation prompt for stopping the session, it initiates a confirmation subdialog.

16. 'start over'. This input token requests the system to abandon the current task and begin anew.

17. optout. This input token is used if the controlling software has determined that the user wishes to be transferred to, another line. There may need to be a parameter with this, to specify the other line.

18. nohear. This input token informs the system that the user has not replied within some preset amount of time. The system issues a remark indicating this and reissues the current prompt. It may also be desirable to parameterize this (e.g., nohear(N)) to provide for multiple "nohear"s before assuming the user is no longer present.

19. lastnohear. This input token informs the system that the user still has not replied, and that processing should be terminated.

20. lostcall. This input token informs the system that the user has hung up, and that the session should be terminated.

B. Sample Output Specification

In a preferred embodiment, the task-oriented Dialog Manager outputs data for conducting a dialog with a user. The following constitute sample output messages:

1. Messages to be output to the user. These can be specified as text or as a list of sound files to play. It is preferable for the Dialog Manager to output both the text and the list of sound files. Alternatively, the format could be set by an ini file switch. In a presently preferred embodiment, messages are output as Utterance objects.

2. Specifications or names of language models to be loaded into the system.

3. Specifications of other parameters that may be capable of being set for the system, e.g. pause durations.

4. Requests for the system to listen for a user input. A special case of this may indicate that this is the user's last chance to respond or give input.

5. The Dialog Manager may issue requests to an external agent such as a database.

6. A request for the controlling software to transfer the call to another line. There may or may not be a human at the end of the other line. Such a request has a parameter to specify the line to which to transfer the call:.

7. A request for the controlling software to hang up on the user.

8. If the controlling software has a logging capability, the Dialog Manager actively requests that something be entered into the log.

9. Miscellaneous error messages reporting problems to the controlling software are also output by the Dialog Manager.

10. A message to the controlling software that the current session should be terminated, if conditions are such that the session can be terminated safely.

It should be understood that the sample inputs and outputs in accordance with the Dialog Manager are not limited to the above described samples, and that not all inputs and outputs described above need be utilized by a Dialog Manager in a session.

Thus, the three principal aspects of the invention, a task-oriented dialog model (or task model), development tool and a Dialog Manager and their interaction has been described. The task model provides the framework for task description. The development tool interprets the specified task model and outputs information to a spoken dialog system to perform the task. The Dialog Manager then uses this output from the development tool in carrying out interactive dialogs to perform the task. The Dialog Manager conducts the dialog using the task model and its built-in knowledge of dialog management. Thus, generic knowledge of how to conduct a dialog is separated from the specific information to be collected in a particular application and it is only necessary for the developer to provide the specific information about the structure of a task, leaving the specifics of dialog management to the Dialog Manager.

Preferably, the present invention employs software. The program(s) can be stored as a set of computer executable instructions on disks or any other computer readable data storage media from which the programs can be downloaded or executed. It should be understood, however, that the invention is not limited to just software. Preferably, for example, hardware is used in the implementation of the system having the Dialog Manager and hardware is generally used to interface with the development tool in accordance with of the present invention.

Thus there have been described systems and methods for implementing IVR and other voice-based systems. It should be noted that the present invention may be implemented in a variety of voice-based applications, including telephony-based IVR applications. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least-one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a magnetic or optical storage medium or device (e.g., magnetic disk or CD ROM). Of course, the storage medium is readable by a general or special purpose programmable computer for configuring and operating the computer when the storage medium or device is read by the computer to perform the procedures described above. The system may also be considered to be implemented as a comn puter-readable storage medium, configured with a computer program, where the storage medium so configured causes a computer to operate in a specific and predefined manner.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A task-oriented dialog model stored as a data structure on or in a computer readable medium, the data structure comprising:
   a first object representing a top-level dialog task;
   a second object representing a roleset of the top-level dialog task, said roleset having a set of concepts associated therewith; and
   a third object representing a concept from said set of concepts, wherein said third object is determined in a dialog carried out in accordance with the dialog model.

2. A task-oriented dialog model as recited in claim 1, further comprising:

a fourth object representing a roleset of the third object, said roleset having a set of concepts associated therewith; and
   a fifth object representing a concept from the set of concepts associated with the fourth object, wherein said fifth object is determined in a dialog carried out in accordance with the dialog model.

3. A task-oriented dialog model as recited in claim 2, wherein the fourth object does not change with different third objects.

4. A task-oriented dialog model as recited in claim 2, wherein the fourth object for a first third object is different from the fourth object for a second third object.

5. A task-oriented dialog model as recited in claim 1, further comprising:
   a fourth object representing a roleset of the third object, said roleset having a set of concepts associated therewith;
   a fifth object representing a concept from the set of concepts associated with the fourth object, wherein said fifth object is determined in a dialog carried out in accordance with the dialog model;
   a sixth object representing a roleset of the third object, said roleset having a set of concepts associated therewith; and
   a seventh object, representing a concept from the set of concepts associated with the sixth object, wherein said seventh object is determined in a dialog carried out in accordance with the dialog model.

6. A task-oriented dialog model as recited in claim 1, further comprising:
   a fourth object representing a second roleset of the top-level dialog task, said second roleset having a set of concepts associated therewith; and
   a fifth object representing a concept from said set of concepts associated with the fourth object, wherein said fifth object is determined in a dialog carried out in accordance with the dialog rnodel.

7. A data structure representing a hierarchical task-oriented dialog model stored on or in a computer readable medium, the data structure comprising:
   a first object representing a top-level dialog task;
   a second object representing a roleset of the top-level dialog task, the second object comprising data, representing a valid range of values for a third object associated with the second object; and
   the third object for storing a value, to be selected from the range of values represented by the second object.

8. A data structure as recited in claim 7, further comprising a set of additional objects representing one or more rolesets of said third object, respectively, wherein the number of said additional objects of said set is variable depending on the value stored in the third object.

9. A data structure as recited in claim 7, wherein the value stored in the third object represents a filler of the roleset represented by the second object.

10. A spoken dialog system, comprising:
    a computer;
    a computer readable medium, operatively coupled to the computer, storing a data structure defining a task-oriented dialog model; and
    a Dialog Managei application running on the computer for conducting a dialog based on the task-oriented dialog model defined by the data structure.

11. A spoken dialog system as recited in claim 10, further comprising:
   a voice receiver for receiving sound input from a user;
   a speech recognizer for reducing sound input from a user to words;
   a natural language interpreter for formatting said words to a format in accordance with inputs to said iDialog Manager; and
   a sound output device for outputting sound corresponding to data output from said Dialog Manager.

12. A spoken dialog system as recited in claim 10, further comprising a voice receiver for receiving voice input.

13. A spoken dialog system as recited in claim 10, further comprising a speech recognizer for reducing voice input from a user to data representing words.

14. A spoken dialog system as recited in claim 13, further comprising a natural language interpreter for formatting said word data to a prescribed format for input to said Dialog Manager.

15. A spoken dialog system as recited in claim 10, further comprising a sound output device for outputting sound corresponding to data output from said Dialog Manager.

16. A dialog design tool for specifying information according to a task-oriented dialog model, comprising:
   a computer readable medium having instructions for receiving and outputting information specifying a task model according to a task-oriented dialog model;
   a visual display for viewing visual output from said tool;
   input means for receiving data relating to the specification of the task model; and
   output means forioutputting an object formatted in accordance with a task specified in accordance with a specified task oriented dialog model.

17. A Dialog Manager for managing a dialog in accordance with an object output from a dialog design tool formatted according to a specified task oriented dialog model, comprising:
   first input means for loading the specified task oriented dialog model into the Dialog Manager;
   second input means for receiving arguments and variables from an external source defining inputs from a user participating in a dialog task defined by the specified task oriented dialog model;
   output means for outputting sounds to a user participating in a dialog task defined by the specified task oriented dialog model; and
   dialog managing means to carry out a dialog that completes the dialog task defined by the specified task oriented dialog model by outputting output data from said output means and receiving input data from said second input means;
   wherein said output data is determined as a function of said input data and said specified task oriented dialog model.

* * * * *